United States Patent

[11] 3,626,382

[72] Inventors John H. Pedersen Brussels; Fernand D. Gillet, Brussels; Slavko C. Radas, Liege; Jacques R. Debras, Liege; Philipe Gransart, Brussels, all of Belgium

[21] Appl. No. 878,072

[22] Filed Nov. 19, 1969

[45] Patented Dec. 7, 1971

[73] Assignee Burroughs Corporation Detroit, Mich.

[54] DATA PROCESSING TERMINAL UNIT
8 Claims, 22 Drawing Figs.

[52] U.S. Cl. ........ 340/172.5

[51] Int. Cl. ........ G06f 5/04, G08c/15/12; H04b 1/38

[50] Field of Search ........ 340/172.5, 152

[56] References Cited

UNITED STATES PATENTS

| | | | |
|---|---|---|---|
| 3,166,636 | 1/1965 | Rutland et al. | 178/24 |
| 3,283,304 | 1/1966 | Sinn et al. | 340/152 |
| 3,314,051 | 4/1967 | Willcox et al. | 340/172.5 |
| 3,348,209 | 10/1967 | Brooks | 340/172.5 |
| 3,403,225 | 9/1968 | Mislan et al. | 179/2 |
| 3,434,117 | 3/1969 | Gibson et al. | 340/172.5 |
| 3,497,627 | 2/1970 | Blasbalg et al. | 340/172.5 |

*Primary Examiner*—Gareth D. Shaw
*Assistant Examiner*—Jan E. Rhoads
*Attorneys*—Kenneth L. Miller and Edwin W. Uren

ABSTRACT: A full duplex online data processing terminal unit for providing remote data processing for a centralized large scale computer. The data processing terminal unit operates in a real time environment whereby mechanical operation by the terminal unit such as printing, forms advancing and keyboard data input, to name but a few, are not interrupted by information processing to and from the communication channels. A single timing system is used to generate the high speed timing of data processing and the relatively extremely slow speed data transmission on the communication channels.

INVENTORS
JOHN H. PEDERSEN
JACQUES R. DEBRAS
SLAVKO C. RADAS
PHILIPE GRANSART
FERNAND D. GILLET

BY Russell C. Wells

ATTORNEY

DATA PROCESSING TERMINAL UNIT

CROSS-REFERENCE TO RELATED APPLICATION

Copending application entitled "Pulse Generating System For Synchronizing Terminal Data Frequency With Communication Line Transmission Speed," filed Nov. 19, 1969, Ser. No. 878,073, by Gillet et al. and assigned to the same assignee as the present invention describes a pulse generating system incorporated in the data processor herein.

TABLE OF CONTENTS

| | Col. |
|---|---|
| Summary of invention | 1 |
| Description of drawings | 1 |
| Detailed description: | |
| System description | 2 |
| Adjunct exchange unit | 4 |
| E state machine | 5 |
| Data-comm controller | 6 |
| Data-comm controller timing | 6 |
| Receive clock generation | 7 |
| Transmit clock generation | 8 |
| Receive state machine | 8 |
| Transmit state machine | 12 |
| Program control | 15 |
| Send buffer input control | 16 |
| Send buffer output control | 17 |
| Receive buffer input control | 17 |
| Receive buffer output control | 18 |
| Claims | 18 |

SUMMARY OF INVENTION

Online data processing systems such as used in the banking industry are becoming more and more complex. In such systems a central computer or central processing unit is connected via communication channels or telephone lines to several terminal units. In the banking industry these terminal units may be placed at several of the branch banks and central processing units be located at the main office of the bank.

Disclosed herein is an online data processing terminal unit which is operated in a real time, full duplex mode of operation. The terminal unit comprises a keyboard having both an alpha and a numeric section for the entry of alpha and numeric data. The terminal unit also has means for the entry of a fixed program routine. Since this is a terminal unit with a fixed purpose, namely that of communicating between the branch and the central computer, this program routine is relatively fixed; therefore, providing a much more efficient unit.

A printing unit is also a part of the terminal unit. This printing unit will provide a visible readout of information received from the central computer. A memory unit is provided within the terminal unit to contain both the programmed information and the data being transmitted and received by the unit.

Both the terminal unit and the computer operate at extremely high speeds or frequencies but the data rate of the communication channel is much slower. A synchronizing means is provided within the terminal unit to synchronize the slow transmission rate of the communication channel with the high-speed processing rate of the terminal unit.

With the provision of a local memory unit within the terminal unit and in cooperation with the program loading means, the terminal unit's function and operation can be changed. The terminal unit has the capability of performing local arithmetic, providing field separation and identification of data fields and providing the capability to do check digit verification. With such capabilities the program load on the central data processor from the several terminal units connected thereto is greatly reduced.

DETAILED DESCRIPTION

System Description

Figure 1:
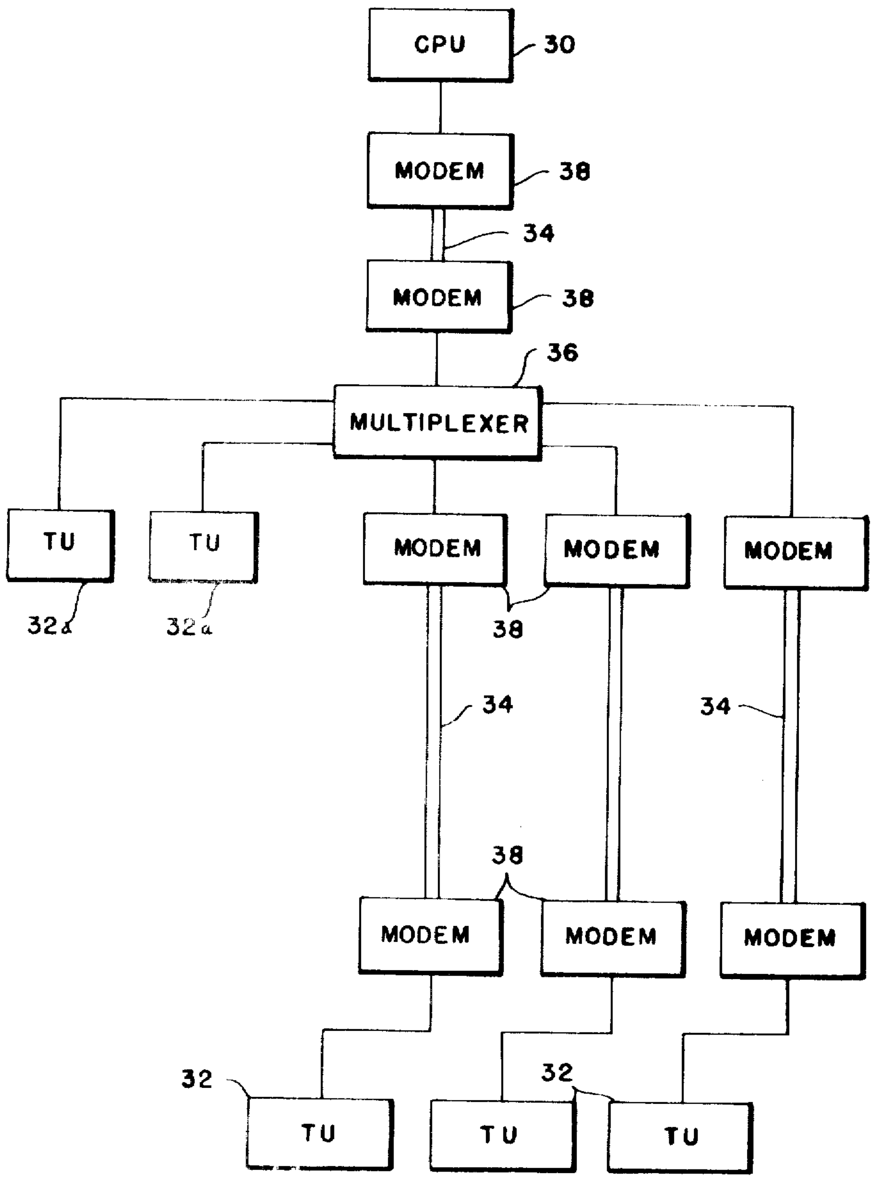
FIG. 1 is a diagrammatic illustration of an overall communication system embodying the terminal unit.

Referring to FIG. 1, there is illustrated in block schematic form the organization of data processing system having a central processing unit hereinafter sometimes referred to as a CPU 30 being operatively coupled to a plurality of terminal units 32. The CPU is a large-scale computer which may be located at a central computing center and the terminal unit is an online unit being coupled in full duplex mode of operation through communication channels 34 or telephone lines and intermediate control units 36 to the CPU. The terminal unit 32 may be located at one of a plurality of smaller computing centers. In such a system as illustrated in FIG. 1 and as will be described herein, the basic function of the terminal unit is to electronically communicate as an input-output data processor with the CPU 30 to essentially bring the capabilities of the CPU to the terminal unit location.

The primary means of communication between the CPU 30 and the several terminal units 32 is by telephone lines 34. At each end of the telephone lines 34 there is a modem unit 38 to modulate and demodulate the electrical signals being transferred thereby. As illustrated in FIG. 1, the CPU 30 is electrically and operatively connected to a modem unit 38 for communicating with a data processing unit concentrator or multiplexer 36 at the other end of the first telephone line 34. Another modem 38, which is identical to the CPU modem, electronically couples the telephone line 34 to the multiplexer 36.

The basic function of the multiplexer 36 is to control the flow of information between any one of a plurality of terminal units 32 and the CPU 30. In the particular system being described, the multiplexer can control up to fourteen modem-terminal units and two directly connected terminal units 32a.

The transmission speed between the terminal units 32 and the multiplexer 36 can be substantially slower than the transmission speed between the CPU 30 and the multiplexer. This difference in transmission speed coupled with the large storage capacity of the multiplexer enables the employment of low-cost, low-grade telephone lines 34 between the terminal units and the multiplexer. In the present system, as an example, the transmission rate between the terminal unit and the multiplexer is approximately 150 baud while the transmission rate between the multiplexer 36 and the CPU is 2,400 baud or higher.

Extrapolating the concept of FIG. 1, it is seen that a centrally located CPU 30 can control a large plurality of remotely located terminal units 32. Such a typical system can be found in the banking industry wherein a central computing center is coupled via communication lines to each and every branch bank. A multiplexer 36 can be used to divide the geographic area served by the bank into separate regions wherein each region can serve up to sixteen terminal units.

Each terminal unit 32 is an operator attended data processing unit which is capable of being operated online with the CPU or off-line for local use. Each terminal unit can be completely controlled by the CPU 30 so that the CPU can transmit messages comprising data information to the terminal unit without the need of having an operator in attendance to receive the message.

Figure 2:
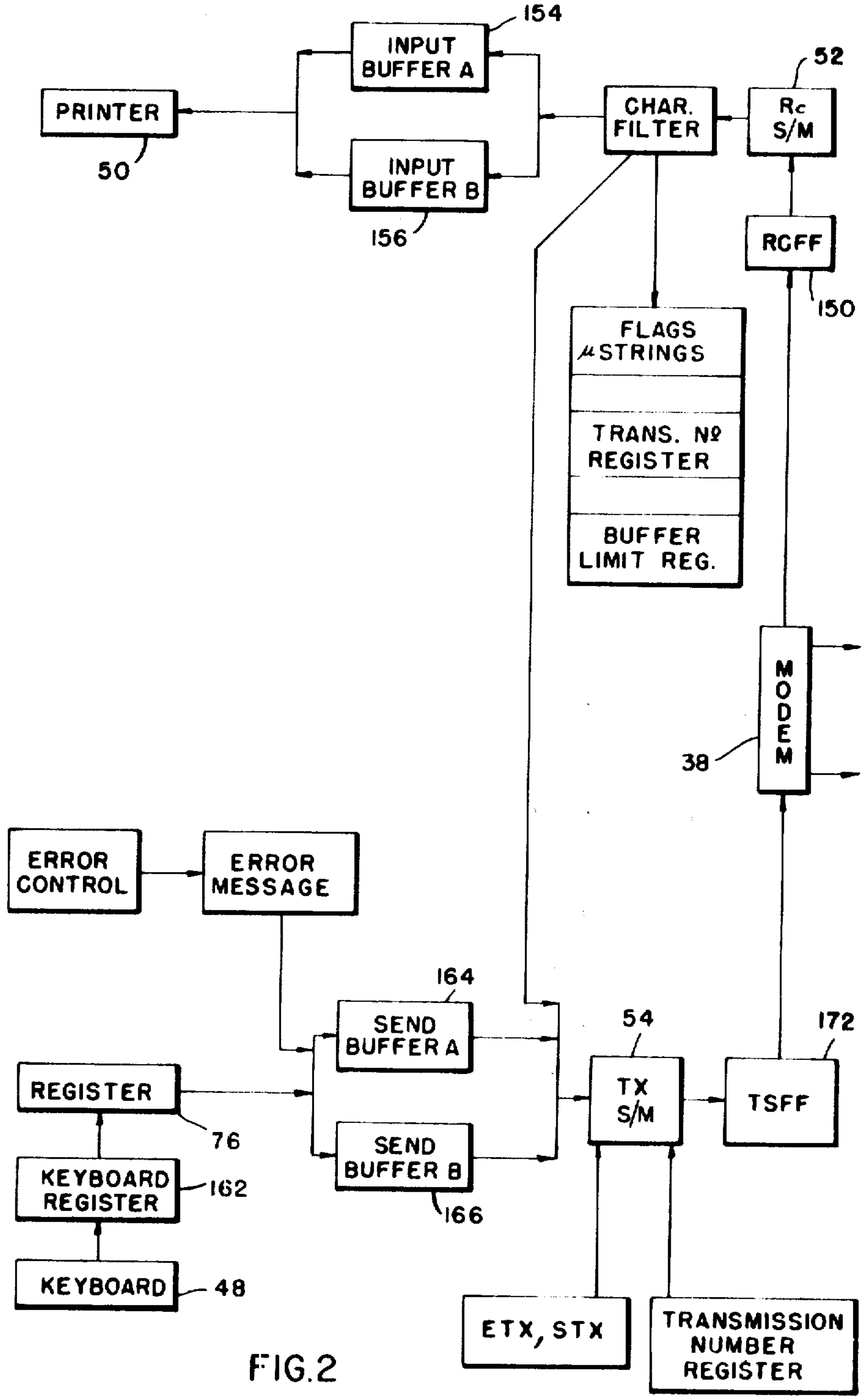
FIG. 2 is a block diagram of the terminal unit.
Figure 3:
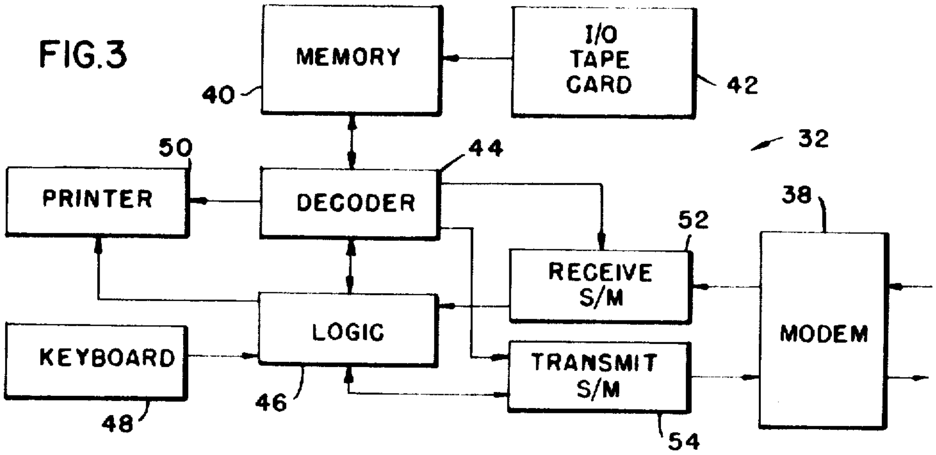
FIG. 3 is a block diagram illustrating the terminal unit in an online mode of operation.
Figure 4:
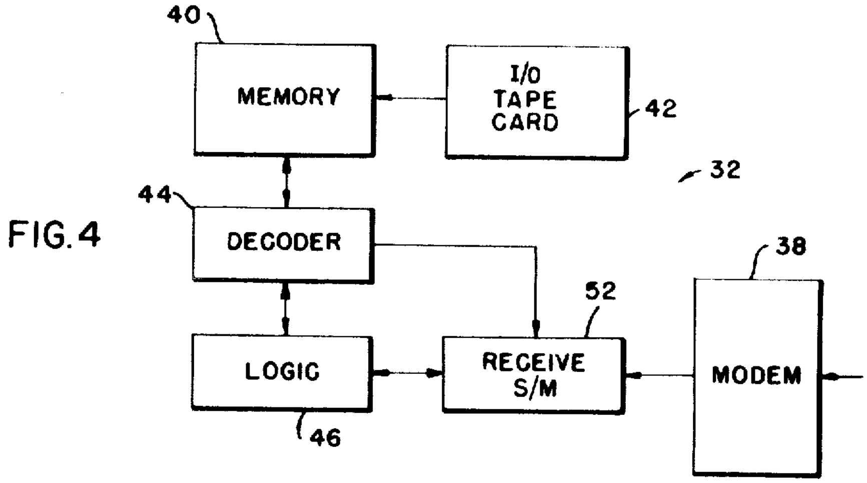
FIG. 4 is a block diagram of the terminal unit in an online standby mode of operation.
Figure 5:
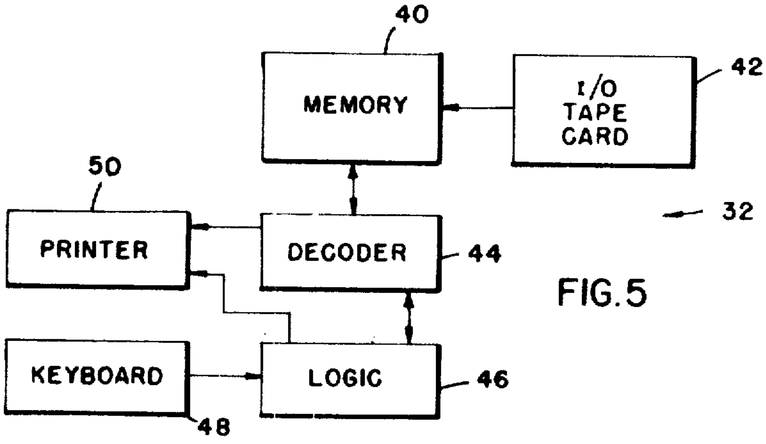
FIG. 5 is a block diagram of the terminal unit in an off-line mode of operation.

The terminal unit 43 comprises several operative sections which are illustrated in block diagrammatic form in FIG. 2. FIG. 3 shows the interaction of each section when the terminal unit is online to the CPU. FIG. 4 illustrates the interaction of some of the sections when the terminal unit is connected in an online standby condition and FIG. 5 shows the interaction when the terminal unit is off-line. In each mode of operation, the firmware and program information or software which is introduced into memory 40 by any one of several input means 42 such as tape, magnetic or paper, punched card, or keyboard input and from memory the firmware is decoded 44 and supplied to the electronic execution logic 46 to control each mode of operation.

In the online mode of operation as illustrated in FIG. 3, the terminal unit 32 has all of its subsystems available for full duplex mode operation. The operator can enter information via the alphanumeric keyboard 48 for printout by the printer 50 and/or transmission to the CPU. The receive control state machine 52 can process information as received by the modem 38 and prepare the information for eventual use by the program. The transmission control state machine 54 can simultaneously process information for transmission to the CPU. The terminal unit can also perform local arithmetic functions.

In the online standby mode of operation as illustrated in FIG. 4, the terminal unit 32 is basically in an idle state with all controls conditioned to receive from the CPU. In this mode of operation, the CPU can activate the terminal unit and place it online.

In the last mode of operation as illustrated in FIG. 5, the terminal unit operates off-line and all the data input is from the keyboard 48 and is printed on the journal by the printer 50. From this mode, the operator can request the CPU to go online.

The keyboard 48, printer 50, logic 46 and firmware sections 40–44 of the terminal unit comprise a stored program digital computer of the type disclosed and claimed in the copending application entitled Data Processing Machine, U.S. Pat. No. 3,579,192, issued May 18, 1971 in the names of Perkins et al. This application, Perkins et al., is assigned to the same assignee as is this application and the Perkins et al. application is incorporated herein by reference. The receive and transmit controls and the modem comprise an improvement to the system disclosed therein.

Within the section of the terminal unit 32 as described in the above mentioned reference, there is a memory section 56 such as a rotating disc for the storage of both program data and object data. Object data being herein defined as that data upon which the computer operates. Customarily such data represents names, addresses, description, amounts and financial information. Program data is defined as the ordered sequence of steps of an operation to perform a specified function. The firmware and software are program data and together they control both the operation of the keyboard 48 and printer 50 and also the operation of the transmit 54 and receive 52 control units to the modem 38.

Figure 6:
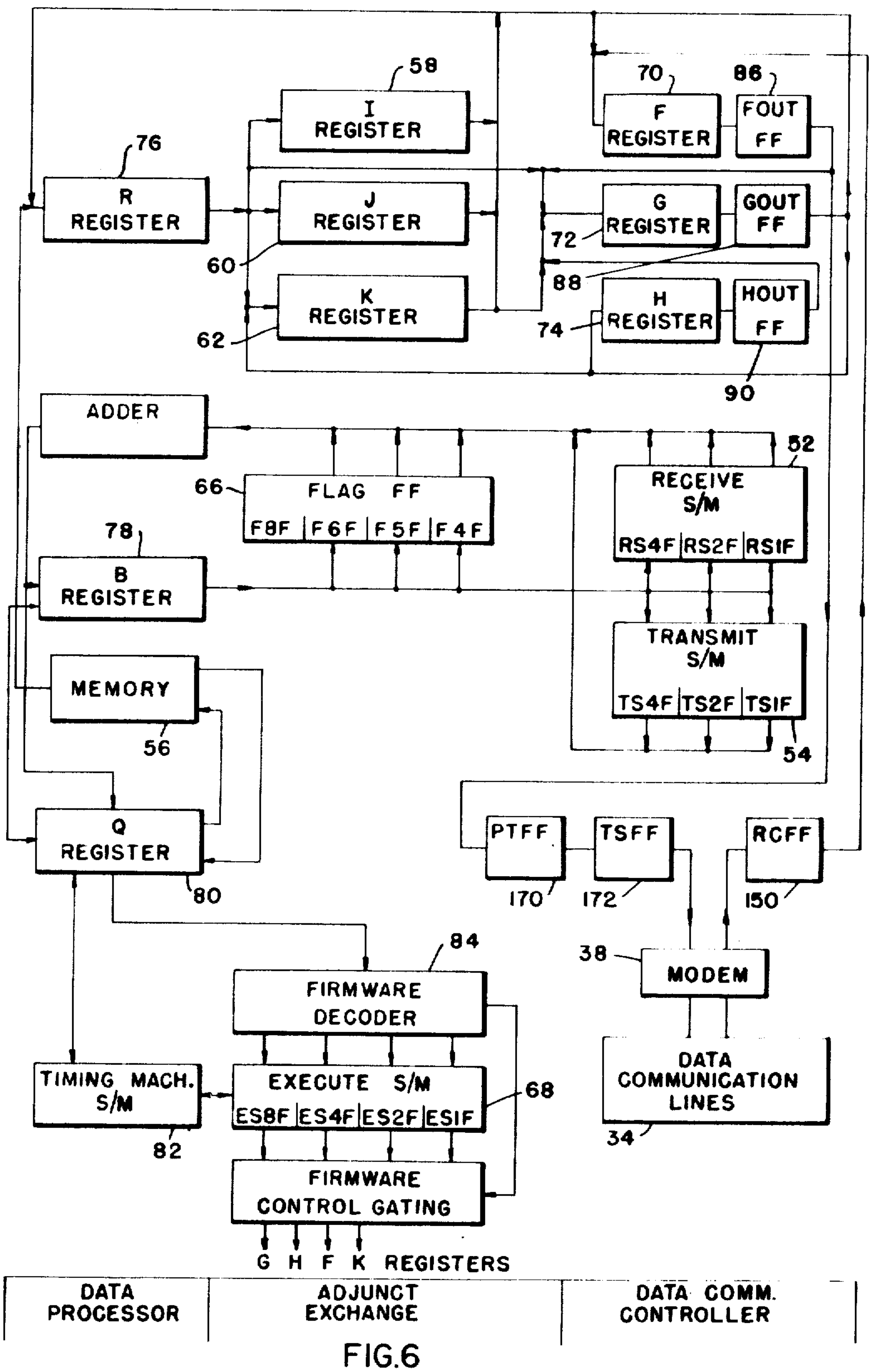
FIG. 6 is a functional block diagram of the terminal unit.

Operatively and electrically connected to the portion of the terminal unit, as described in the application hereinbefore incorporated and illustrated in FIG. 6, are two sections which are identified as the adjunct-exchange and the data-comm controller. The adjunct-exchange comprises three recirculating shift registers or loops 58, 60 and 62, a plurality of flag flip flops 66 which function as control indicators and the execution state machine 68. The data-comm controller operatively connects the adjunct-exchange to the modem and comprises an additional three recirculating registers 70, 72 and 74, the receive 52 and transmit 54 state machines and the modem 38.

Each modem 38 which is electrically connected to each terminal unit 32 is coupled to another modem which is electrically connected to the multiplexer 36. Between each pair of modems is a two-wire communication channel 34 such as a telephone line pair. Each modem 38 which is attached to the terminal unit receive data information at a first basic frequency and transmits data information at a second basic frequency. Likewise, the modems electrically connected to the multiplexer 36 transmits data at the first basic frequency and receives data at the second basic frequency.

Adjunct Exchange Unit

In the adjunct exchange unit there are three recirculating shift registers which will be identified by the I loop 58, J loop 60 and K loop 62. Each shift register comprises 66 stages which correspond to the total number of information bits in one word. The three shift registers are each capable of receiving information from the data processor, for use by the adjunct exchange. The information is transferred from the basic memory unit 56 into the R register 76 all within the data processor and from the R register the information is transferred by command to any one of the three recirculating shift registers 58, 60 and 62. The I and J registers 58, 60 are basically used as working registers and allow transfer of information between either one of them and the R register 76. The K register 62 in addition to transferring information between itself and the R register also transfers information into the data-comm control unit.

The four flag flip-flops 66 in the adjunct exchange are the basic control indicators for the complete terminal unit 32 when operating in either one of the online modes of operation. Three of the four flip-flops (F4F, F5F, and F6F) are addressed from the B register 78 in the data processor and are responsive to the firmware or program commands of the terminal unit. The four flip-flops are identified as FF4, FF5, FF6 and FF8.

The FF4 flag is the printer power on flag and controls the main printing power of the terminal unit 32. When it is set it indicates that the printer power is on regardless of whether the terminal unit 32 is being operated in the online or off-line modes. The CPU 30 can turn the printer motor on or off by sending a control signal to set or reset this flip-flop.

FF5 is the request to send flag. When it is set, the data-comm controller through the modem 38 turns on the transmit carrier in the preparation for data transmission to the CPU. When this flag is reset, the transmit carrier is turned off.

FF6 is a data carrier detect flag and it detects the carrier signal as received by the modem 34 from the CPU 30. Whenever the carrier signal is not being received this flip-flop is reset and the firmware control is informed that the carrier signal is not being received.

FF8 flag is responsive to certain programmed instructions which indicate that the contents of the B register 78 and the R register 76 or the G register 72 are not equal. This is important in the execution of the several steps in firmware control.

In the data processor the firmware is encoded within the memory unit 56 and for the execution of each of the several steps of the firmware these steps are withdrawn from the memory unit 56 and temporarily stored in the Q register 80. Whenever a step of the program indicates that information is to be received by or transmitted from the data-comm controller this instruction appears in the Q register and is decoded to operate the execute or E state 68 machine.

E State Machine

The E state machine 68 is a supervisory control state machine for both the adjunct exchange and the data-comm controller. The E state machine comprises four flip-flops 92, 94, 96 and 98 taken in combination generate sixteen different states which are responsive to the firmware commands to transfer information between the adjunct exchange and the data-comm controller. As shown in FIG. 6, the execute or E state machine 68 is operatively connected to the timing state machine 82 of the data processor. The timing state machine 68 functions to control the operation of the entire terminal unit 32 including the basic data processor and the adjunct exchange; however, there are commands which are necessary to operate the adjunct exchange and the data-comm controller. These instructions function to control the flow of data between the six separate registers within the adjunct exchange and the data-comm controller. The majority of these instructions are for the transferring of data between the G register 72 and the F 70, the H 74, or the K 62 register.

Figure 7:
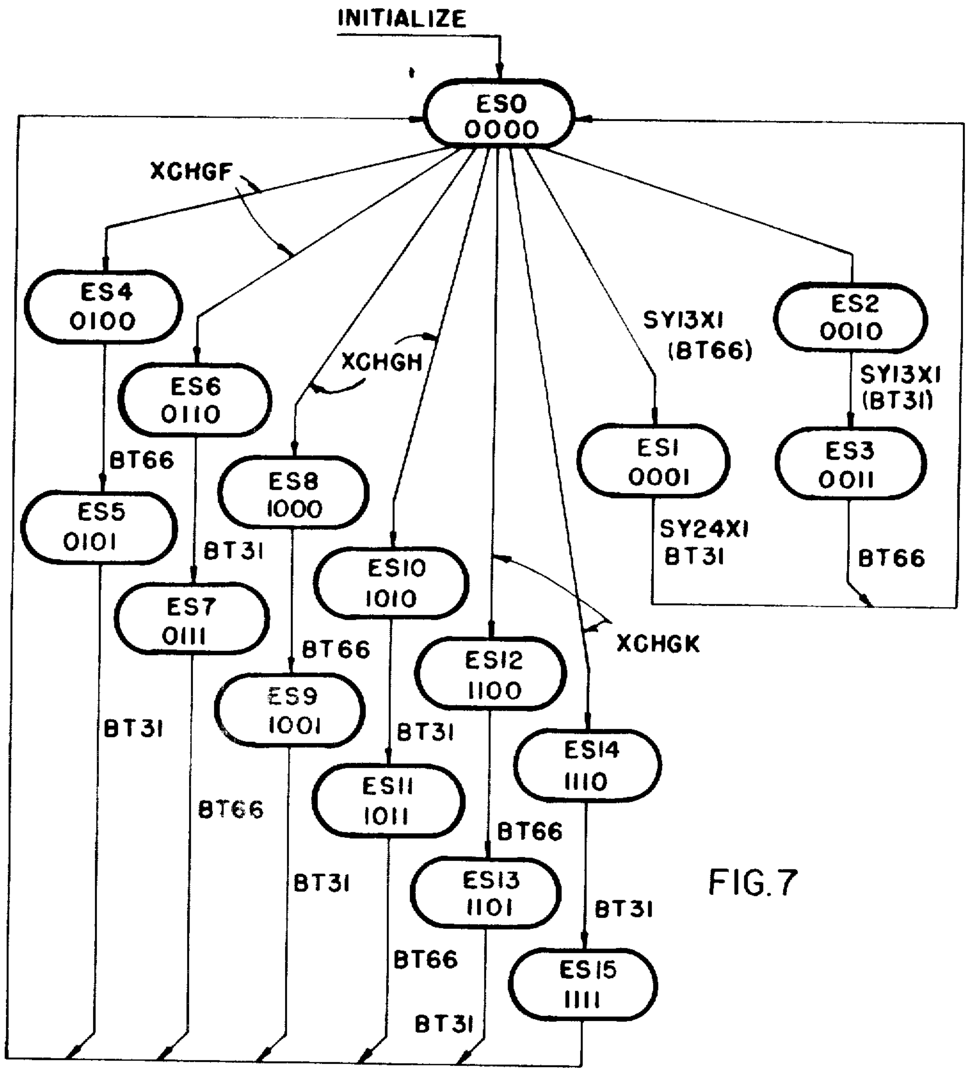
FIG. 7 is the E state machine diagram.
Figure 8:
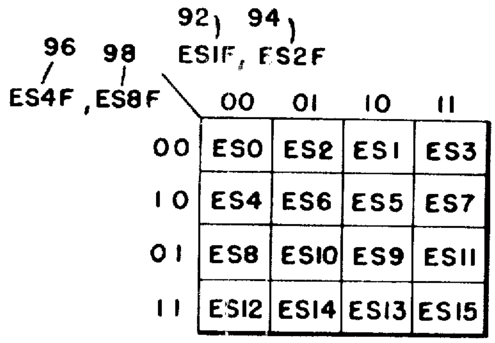
FIG. 8 is a Karnaugh Map of FIG. 7.

The E state machine 68 is so arranged that whenever the ES1F flip-flop is set, this is an execution state and whenever the ES2F flip-flop is set, this indicates an upper half word instruction. FIG. 7 is the flow diagram for the E state machine and FIG. 8 is the Karnaugh Map of the four flip-flops 92, 94, 96 and 98 for the E state machine.

Figure 24:
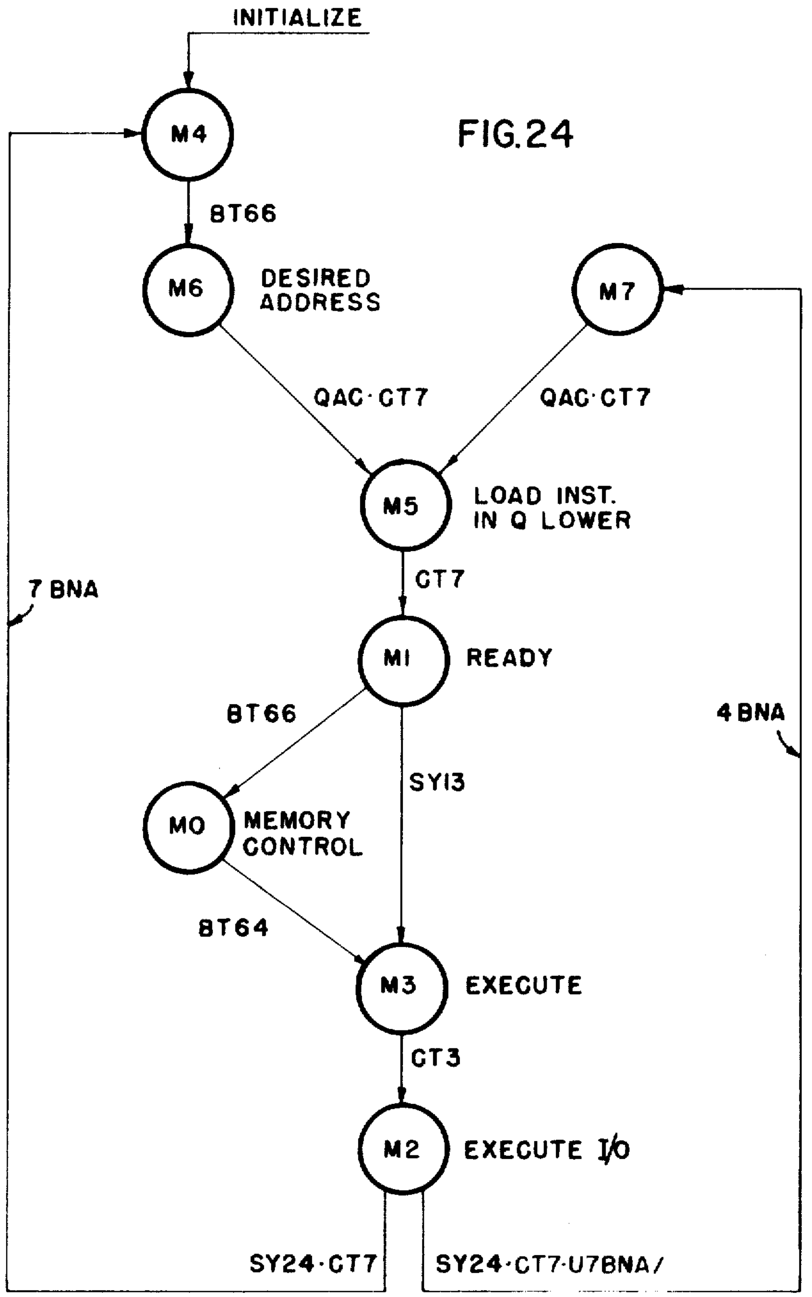
FIG. 24 is the Timing Machine State diagram.

The execution states for the timing state machine 82 which is illustrated in FIG. 24, are state M3 and state M2. Whenever a command or instruction is read from the memory which concerns or controls the adjunct exchange of the data-comm controller this command is read and stored in the Q register 80. In machine state M5 of the basic timing state machine 82, whenever a command such as XCHGH which is exchange the G and H register and for the purpose of illustration we will work with the upper portion or bits 32 through 66, is transferred from the memory into the Q register, in timing machine state 5. This command is decoded in the firmware decoder 84 of the adjunct state machine. As shown in FIG. 7, the E state machine will progress from ESO to ES1O. This progression from ESO to ES1O is a function of the decoding of the command in the firmware decoder 84. This will set the flip-flops ES8F 98 and ES2F 94. The state machine 68 remains in ES1O until bit time 31, to progress from ES1O to ES11, the ES1F 92 flip-flop is set which puts us into an execution state. During the next 32 bit times the information in the G 72 and H 74 upper register portions are transferred one to the other, While this transfer or command is being executed in the E state machine 68 the basic timing state machine 82 can execute other instructions in the same time.

The E state machine 68 is merely an extension of the timing state machine 82 of only data processor. In the overall terminal unit there is only one processor except in this instance when we are exchanging and controlling information flow within the adjunct exchange in the data-comm controller. Then the E state machine 68 will function and operate allowing the basic timing machine 82 to function. With this small processor within the terminal unit itself there are no program interruptions of the operation of the basic data processing machine whenever information is being received or transmitted to the telephone lines 34. The terminal unit can operate and function from the keyboard 48, cause printing, during which time it is also receiving information from the telephone lines 34 or transmitting information to the telephone lines.

The E state machine 68 through its operation, permits operation of the terminal unit 32 in a real time system since there is basically only one processor. As shown in FIG. 6, the E state machine 68 is initially set up from firmware decoding via the Q register 80 and functions within the basic timing state machine 82 time frame. The output coding of the several states of the E state machine 68 then sets up controls for the flow of data within the adjunct exchange and the data-comm controller.

Data-Comm Controller

The data-comm controller operatively connects the adjunct exchange with the modem 38 and functions to control both the transmission and reception of data to the terminal unit 32. The three recirculating shift registers, the F 70, G 72, and H 74 registers are 66 bit recirculating shift registers. The bit positions zero through 31 which are identified as the lower bit positions within each register are used in conjunction with the transmit state machine 54 for the transmission of data to the modem 38. The upper bit positions bit 32 through bit 66 function with the receive state machine 52 the control data being received by the modem. The pulse output of the lower half of the F register 70, bits zero to 31 or characters 0, 1, 2 and 3 are extracted by the transmit state machine 54 and transmitted to the modem 38. In a similar manner the receive state machine 52 controls the information flow from the modem 38 to the upper half or characters 4, 5, 6 and 7 of the F register 70.

The H register 74 is used by both the transmit and receive state machines as a bit pointer to indicate whether or not there is information in either the upper or lower half of the F register.

The G register 72 which is the main working register in the data-comm controller, receives information from the R register 76 in the data processor and transfers that information to either the H 74 or the F 70 register. The G register also receives information from the K register 62 in the adjunct exchange for purposes of transferring such information to either the F or H register.

When the data-comm controller is in the transmit state, the firmware, by way of R register 76 and G register 72, loads the lower half of the H register 74 with binary ones in every bit position of each character which is to be transmitted. The transmit state machine 54 electronically tests the H register for the presence of a binary one in the first four characters and then transmits the corresponding bit position in the F register 70. If the data-comm controller is in the receive state, the upper half of the H register is loaded with binary zeros indicating that the upper half of the F register is empty. As each bit of information is received from the modem 38, the receive state machine will write a binary one in the corresponding position of the H register for each bit of information loaded into the F register. When any one or more of the upper characters of the H register are loaded with all ones, the firmware initiates the transfer of information from the F register through the G register into the R register for processing. The outputs of each of the above-mentioned registers, F, G, and H are respectively routed through a flip-flop labeled FOUT 86, GOUT 88, and HOUT 90.

Data-Comm Controller Timing

The data-comm controller requires a timing system to synchronize the processing rate of the data output pulses from the data processor with the data transmission rate of the communication channel.

The basic timing clock pulse repetition time is 4.66 microseconds with a pulse width of approximately 0.5 microseconds. The transmission rate in the preferred embodiment of the terminal unit 32 is 147 baud wherein the pulse width is approximately 6.8 milliseconds. To achieve synchronization between the basic timing clock pulse and the speed of transmission, the RCL 100, receive clock signal, and TCL 102, transmit clock signal, are generated.

Figure 10:
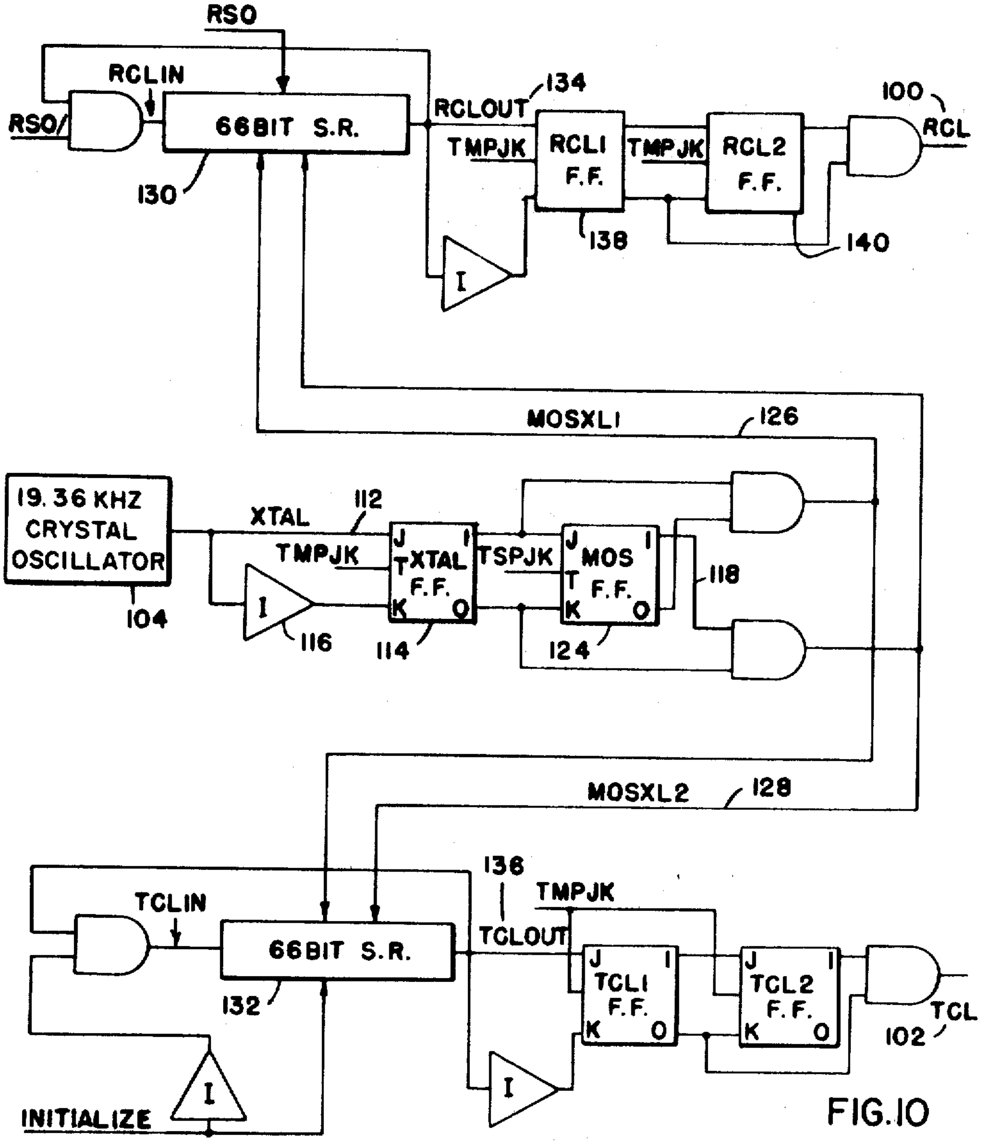
FIG. 10 is a logic diagram of the synchronizing unit.
Figure 9:
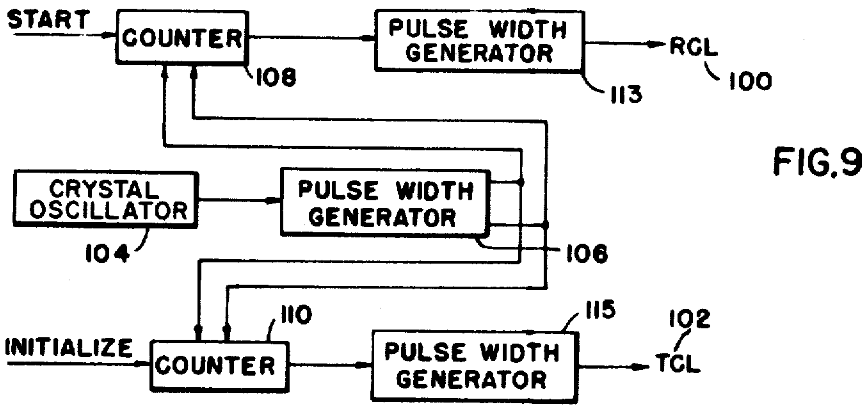
FIG. 9 is a block diagram of the synchronizing unit.

In general the system for each clock, RCL 100 and TCL 102, FIG. 9 and FIG. 10, comprised a crystal oscillator 104 for developing a series of pulses at a very stable frequency, pulse width generating means 106 for decreasing the pulse width of the oscillator 104 while maintaining the same pulse repetition rate, a counter 108, 110 and a second pulse width generating means, 113, 115 for decreasing the pulse width output of the counter while maintaining a pulse repetition rate equal to the pulse rate of the counter. Since the terminal unit 32 is receiving and transmitting data at the same baud, the RCL 100 and TCL 102 pulses have the same basic timing dimensions.

In the preferred embodiment, the crystal oscillator 104 has a frequency of 19.36 kHz. having a pulse cycle time of 51.6 microseconds. As shown in the timing diagram of FIG. 13 the output of the crystal, XTAL 112, is a symmetrical square wave. This output XTAL 112, is synchronized with the basic timing clock of the data processor by a J-K flip-flop XTALFF 114 wherein the output of the oscillator is electrically connected to the J input of the flip-flop and also the output signal of the oscillator is inverted 116 and electrically connected to the K input of the same flip-flop 114. The flip-flop 114 is triggered by the basic timing signal of the data processor. Therefore, the equations for the crystal flip-flop 114, XTALFF are:

XTALFF=XTAL·TMPJK

XTALFF/=XTAL·TMPJK

Figure 13:
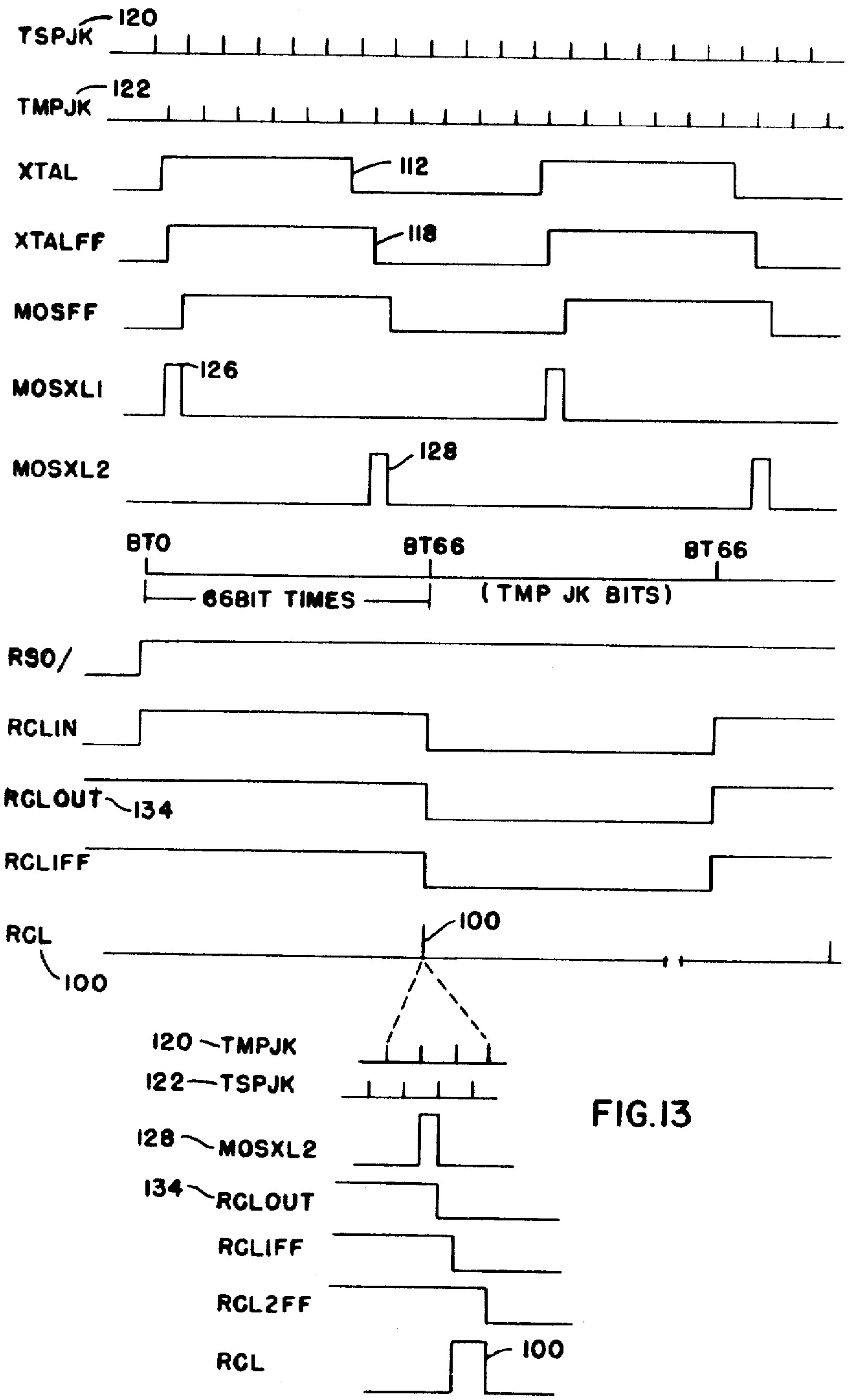
FIG. 13 is a timing chart of the synchronizing unit.

As shown in the timing diagram FIG. 13, the output of the crystal 104 is asynchronous to the basic timing of the data processor and the output 118 of the crystal flip-flop XTALFF is synchronized with the basic timing of the data processor.

Referring again to the timing diagram, there are shown two basic timing signals; namely, TMPJK 120 and TSPJK 122. Each of these timing signals are 500 nanoseconds in width and spaced 4.66 microseconds apart in time. TSPJK 122 may be considered a slave pulse in that it is generated from the TMPJK 120 pulse and falls midway between successive TMPJK pulses. Thus the time between a TMPJK pulse and a succeeding TSPJK pulse is 2.33 microseconds.

The usable pulse outputs from the oscillator circuit cannot be at the frequency of the oscillator or 51.6-microsecond pulse repetition time but must be decreased in pulse width but the pulse repetition rate must be maintained. This is accomplished by a second J-K flip-flop called MOSFF 124 which is clocked by the TSPJK 122 signal. The equation for the outputs of this flip-flop are:

MOSFF=XTALFF·TSPJK

MOSFF/=XTALFF/·TSPJK

Both of these outputs have the same pulse time width as does the crystal flip-flop; namely, 51.6 microseconds but each output is spaced from its corresponding crystal flip-flop output by the 2.3-microsecond interval between TMPJK and TSPJK. Therefore, the usable outputs are MOSXL1 126 and MOSXL2 128 which are generated according to the following equation:

MOSXL1=XTALFF·MOSFF/

MOSXL2=XTALFF/·MOSFF which generates a timing pulse having a pulse width of 2.3 microseconds and a pulse repetition rate of 51.6 microseconds. This is illustrated on the timing diagram FIG. 13 where MOSXL2 128 is spaced midway between successive MOSXL1 126 pulses.

To achieve the correct pulse interval which is necessary to transmit data over the data communication lines, the desired pulse repetition time of 6.8 milliseconds was divided by the pulse repetition time of oscillator circuit of 51.6 microseconds and a count number of 132 resulted. Therefore, every 132nd pulse of the oscillator must be used to synchronize the data of the terminal unit 32 with the data on the communication lines 34. A 66-bit shift register 130, 132 is used as a counter and with the appropriate control usable output 134, 136 is generated every 3.4 milliseconds. This output 134, 136 is further divided and the pulse width corrected to achieve the desired pulse width time of 4.3 microseconds at a pulse repetition time of 6.8 milliseconds to agree with the transmitted data rate of data communication lines 34.

Receive Clock Generation

When the power to the terminal unit is turned on, the signal RSO causes the counter 130, which in the preferred embodiment is a shift register, to clear, leaving each stage with a binary signal level equal to a count of zero. The construction of the shift register 130 in the preferred embodiment is such that by loading a binary one signal into the first stage of the shift register, 66 stages later this signal will appear at the 66th stage as a zero. Thus by initalizing the shift register to all zeros, the output of the shift register will have a binary one value for a time equal to 66 shifts. The preferred embodiment also has a dual clocking signal system where a complete shift from one stage to the adjacent stage is completed after two clocking or shifting pulses 126, 128.

The input to the shift register 130 is defined by the following equation:

RCLIN=RSO/·RCLOUT where

RSO/ = The receive state machine is not in receive state zero.

RCLOUT = is the output of the shift register.

Therefore, until the receive state machine 52 begins to run, the input to the shift register 130 is always true and the output remains constant.

In the receive state machine 52, the input data must be synchronized with the data processor when first received. Since this terminal unit 32 is an asynchronous unit, the receipt of information may be at any time, therefore the RCL clock must be turned on at the receipt of the start pulse 137, FIG. 20. This point in time is indicated by the progressing of the state machine from RSO to some other state such as RS4 as in the preferred embodiment.

When RSO/ goes true, the input to the shift register goes true and 66 shifts later, the output level of the shift register RCLOUT 134 goes false. With RCLOUT false, two functions are initiated; namely, (1) the input to the shift register is inverted and, (2) a second pulse width generator 113 is activated.

The output of this pulse width generator 112 is defined by the following equation and is illustrated in detail on the timing diagram FIG. 13.

RCL=RCL1FF/·RCL2FF

Figure 20:
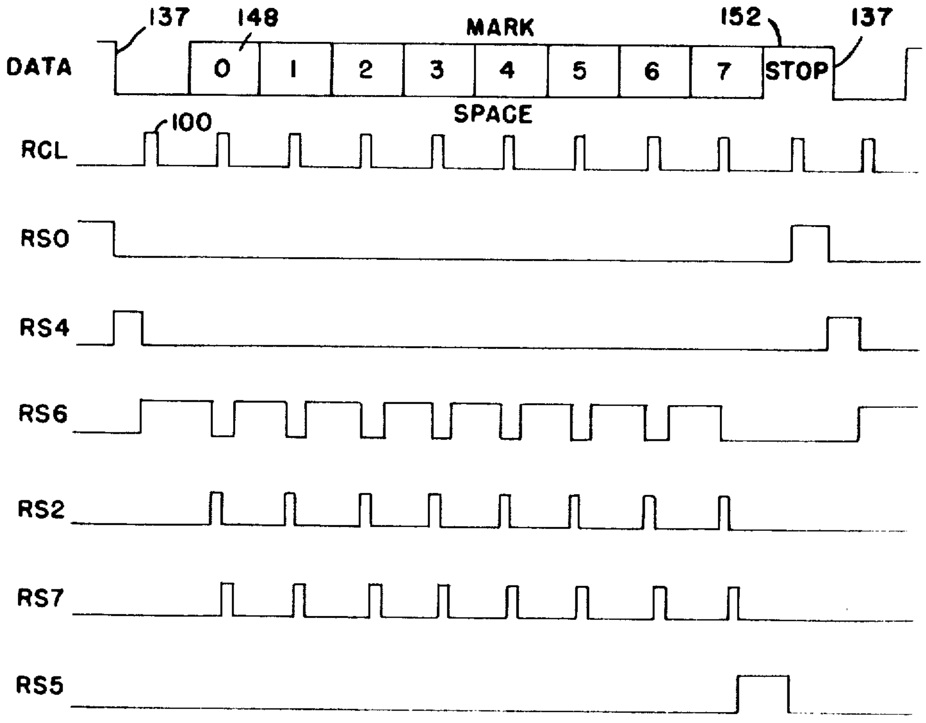
FIG. 20 is a timing chart for the Receive State Machine.

As shown, the first RCL pulse occurs after the first 66 shifts of the shift register and then every second complete shift or 132 shifts later. As shown in FIG. 20, this places an RCL pulse at the midpoint of each received data pulse.

Figure 11:
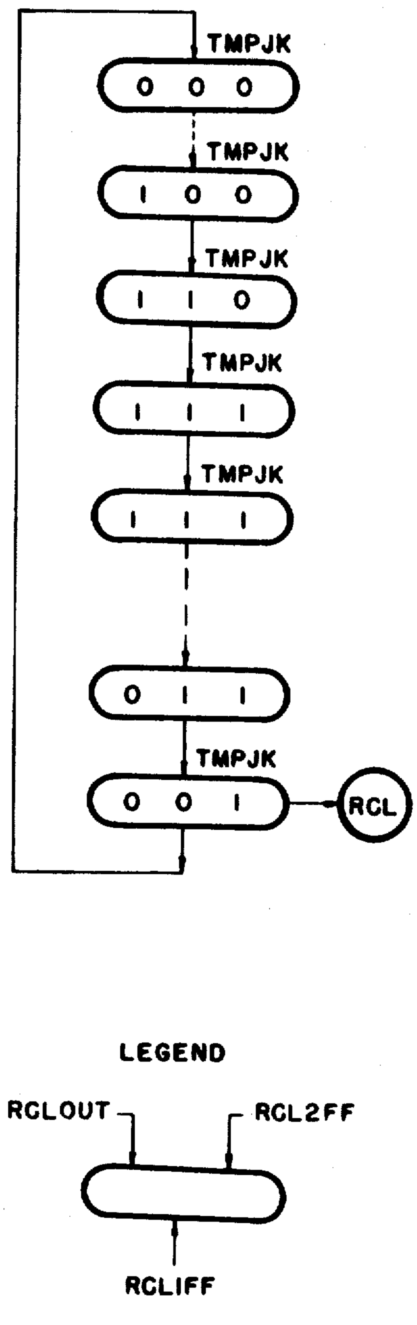
FIG. 11 is a state diagram of a portion of the synchronizing unit.

FIG. 11 is the state machine diagram for the receive clock generation. The state machine is shown as the states of the output of the counter or shift register 134 and the outputs of the two J-K flip-flops, 138, 140. The dashed connecting line between the state identified as 111 and the state identified as 011 and between the state identified 000 and the state identified 100 illustrates the 66 shifts or counts of the counter 130.

Transmit Clock Generation

The transmit clock TCL generation is accomplished in the same manner as RCL with the sole exception in the control of the counter 132 or shift register. In the preferred embodiment, the transmit clock TCL 102 is a continuous running clock which synchronizes the transmit state machine 54 with the transmission line since the terminal unit during transmission is the master control of the signals being transmitted.

Figure 12:
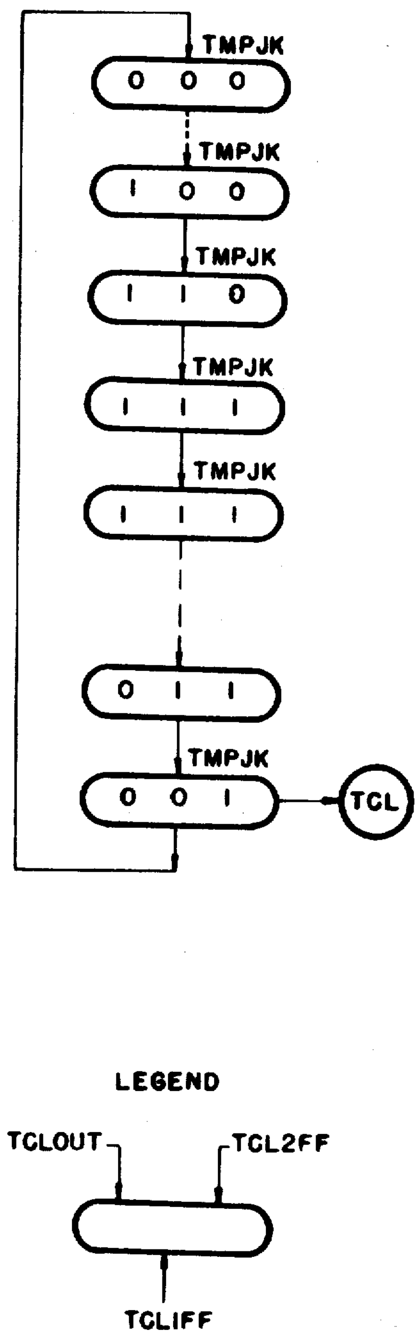
FIG. 12 is a state diagram of another portion of the synchronizing unit.

The state diagram of FIG. 12 shows the binary status of the several signals in the TCL generation system and as in FIG. 11 the dashed line between the state identified as 111 and the state identified as 011 and the state identified as 000 and the state identified as 100 illustrates the 66 shifts or counts of the counter.

Thus it can be seen that the clock can be started and stopped under electronic control by controlling the signals to the counter 130, 132. Also the output of the clock can be varied by altering any of the constants of FIG. 10.

Receive State Machine

The terminal unit 32 is always in the receive state having the ability to respond to signals from the CPU. Information from the CPU is received from the telephone lines 34 by the modem unit 38 which functions to demodulate the received signal. The output of the modem 38 is a two level or binary signal wherein one level represents a mark signal and the second level represents the space signal. This received information is processed by the receive state machine 52 from the modem into a temporary storage register or F register 70. In the preferred embodiment, the F register has four characters or 32 bits of information.

The received information is then transferred under command from the F register 70 to a transfer storage register or G register 72 and then through the R memory access register or R register 76 to the memory 56 for storage and ultimate use by the data processing unit. Prior to receipt of information the F register must be cleared of all previous data.

In order to determine the status of the F register 70 as respects the content of information, a corresponding register called a bit pointer register or H register 74 is provided. The function of the H register is to indicate each bit position that contains data information. Since, in the preferred embodiment, the coding format is in ASCII seven-bit code, information is conveyed by the presence and absence of a bit. For this reason, as a piece or bit of information is entered into the F register one bit is entered in the corresponding bit position in the H register. As an example, if the data information received is the letter "A," the coding of which is 1000 0010 in binary code, the corresponding character in H register will be 1111 1111 which indicates that for every bit position where there is a one in H register there is data in the corresponding bit position of the F register when the terminal unit finds a one bit in the 39th, 47th, 55th or 63rd bit position of the H register period.

To prepare the terminal unit for receiving data information, the following program of microinstructions or machine operations may be used with the identified results.

a. Clear R—This instruction is executed by the data processor to clear the R storage register 76 of all information leaving all zeros therein. This is accomplished by serially resetting each stage of the storage register by successive clocking signals.

b. Exchange R and G—This instruction causes the full word, eight characters of R register 76 to be exchanged with the full eight characters of the G register 72. As previously mentioned, both the F, G and H register are organized as half words wherein four characters are for receive and four characters are for transmit. At this point the R register has whatever was in the G register which will be disregarded and the G register contains all zeros.

c. Exchange G and F upper—Since the terminal unit is preparing to receive data, only the upper half word of the F register 70 will be cleared. At this point, all four characters of the F register, CH4 through CH7, contain zeros.

d. Clear R—Here all of the information which is in the R register 76 is cleared and replaced by zeros.

e. Exchange R and G—This effectively transfers the zeros in the R register to the G register 72. This is a whole word or eight character exchange.

f. Exchange G and H upper—This is a half word exchange putting all zeros in characters four through seven of the H register.

In summary, the above may be written in microinstruction form as follows:

CLR
XCHRG
XCHGFU
CLR
XCHRG
XCHGHU

At the conclusion of the execution of these instructions, the F register and H register upper half word characters four through seven are clear. The terminal unit 32 is ready to receive information from the CPU 30 under control of the receive state machine 52.

The receive state machine 52 comprises three J—K flip-flops 142, 144, 146 which in combination define the eight states of the receive state machine which are defined as follows:

| | |
|---|---|
| RSO | Initial state wait for start pulse. |
| RS1 | Bad start bit detection, firmware action initiated. |
| RS2 | Waiting state until the receive half word section of the registers are available. |
| RS3 | Receive buffer full firmware action is initiated to transfer the receive buffer into memory. |
| RS4 | Start bit has been received and receive clock is initiated (RCL). |
| RS5 | Detects stop bit. |
| RS6 | Waiting state until detection of middle of received bit. |
| RS7 | Waiting state until bit pointer is found to indicate correct bit position to transfer data into F register. |

Figures 14, 15:
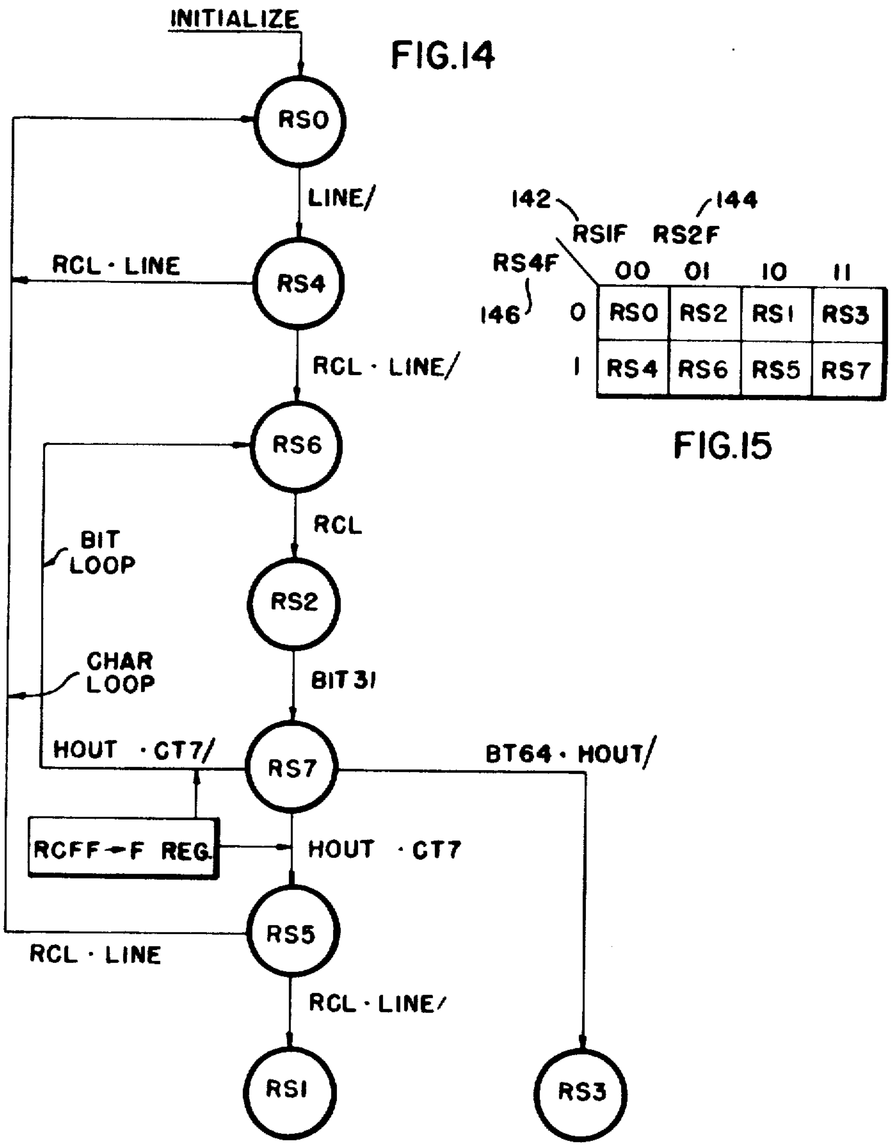
FIG. 14 is the Receive State Machine diagram.
FIG. 15 is a Karnaugh Map of FIG. 14.
Figure 16:
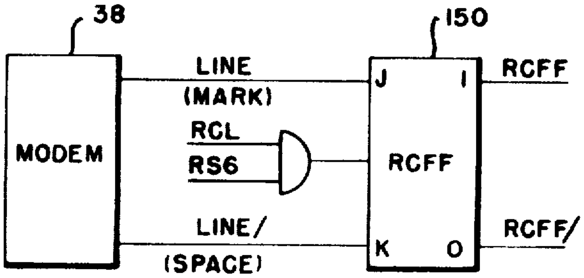
FIG. 16 is a logic diagram of the receive flip-flop.

Referring to both the timing chart FIG. 20 and the receive state flow diagram FIG. 14 the transfer of data will be described. As previously stated, both the F register 70 upper which is the receive buffer, and the H register 74 upper which is the receive bit pointer are clear indicating that the first bit of data information will go into character four-bit position zero which is bit 32.

When the message as shown in FIG. 20 begins to come into the modem 38, the carrier signal on the telephone lines 34 is at a mark level. The start bit 137 or signal is defined as the transition from the mark level to the space level. For the purposes of equation formatting the signal name for the mark level is LINE and the signal name for the space level is LINE/.

When the LINE signal is reset the state machine progresses from RSO to RS4 by setting the RS4F flip-flop 146. This occurs at the start signal as defined in the state diagram by LINE/ and shown on the timing diagram. In RS4 the receive clock is generated as previously described. During this state the microinstructions in the main memory 56 constantly test the status of the line signal to determine whether or not the incoming signal has returned to mark level. If this happens while the state machine is in RS4, the signal is determined to be incorrect and the state machine returns to RSO to await a valid start.

As previously shown, the first RCL pulse 100 will occur at the midpoint between the start pulse 137 and the beginning of the first data pulse 148. At this point, the state machine progresses from RS4 to RS6 and there awaits until the next RCL pulse which is generated at the middle of the first data bit. During RS6, at RCL the line signal from the modem 38 is strobed or stored into the receive flip-flop, RCFF 150 for processing by the receive state machine 52. At this time, the state machine progresses to RS7 to await for the receive buffer to be opened. This occurs at BT31 which is one bit time prior to upper half word.

At BT31 the state machine progresses to RS7 where the H register 74 is searched for the first zero signal which indicates the first open data bit position in the receive buffer. To accomplish this search, the recirculation path for the H register is opened and when the first zero is detected, the recirculation path of the F register 70 is opened and the output of the receive flip-flop RCFF 150 is strobed or stored in open bit position. The next bit time the recirculation paths for both the F and H registers 70 and 74 are closed and the state machine progresses to RS6.

This operation continues for the eight data bits as shown in FIG. 20 labeled zero through seven. When the state machine is in RS7 for the eighth bit or CT7, the exit path from RS7 is to state five, RS5. This path processes the stop bit 152 of information. The state machine remains in RS5 until the RCL pulse in the middle of the stop bit 152 position. If the line is true, the signal is LINE. The decision is made that this is a good stop bit and therefore the character which has been loaded into the F register 70 is correct. If the line is at space, LINE/, the state machine progresses to RS1 where the firmware will process an error alarm message for action by the data processor and extinguish the RCL clock.

As shown in the state diagram, the path RS6 to RS2 to RS7 to RS6 is indicated as the bit loop and the path from RS5 to RS0 is the character loop.

When the information is stored in the receive buffer or F register 70 the firmware control can then control the flow of this information into the data processor. The data from the receive buffer which may be one, two, three, or four characters long, will first be processed through a character filtering and checking network. This network may comprise any well-known type of comparator circuit such as a binary tree wherein certain outputs are recognized. Each specially recognized output, which in the preferred embodiment are basic message control signals, are processed in a manner different from that of data information. The following are typical basic single character messages which are filtered out of the flow of data information at this time:

a. ACK—This signal which is an abbreviation for acknowledgment is a basic one word message which is an indication by the CPU that a previous message transmitted by the terminal unit has been correctly received. This signal when recognized is directed to the transmit logic to open the last used transmit storage buffer.

b. NAK—This signal is the opposite of the previous signal and is an indication from the CPU that the previously transmitted message was incorrectly received by the CPU and will cause the terminal unit to retransmit that message.

c. EOT—This signal means end of transmission and functions to halt data transmission between the terminal unit and the CPU.

d. ENQ—This signal means INQUIRE and is a request by the CPU as to the status of the terminal unit.

These above-mentioned, single word messages, are control messages and are therefore all processed along different data paths than are the data of the text message. A typical data format is as follows:

| | | | | |
|---|---|---|---|---|
| ST | | A | | EB |
| | Text | | TEXT | |
| TR | | C | | TC |
| | #1 | | #2 | |
| X# | | K | | XC |

This format shows an embedded ACK within a text message. As will be shown this signal ACK is filtered out and the text retains its continuity.

Four other basic message characters are also shown; namely, STX, TR#, ETX and BCC:

a. STX —This signal is the beginning signal of the message format and is used to activate or initiate a control member or flag to further control the flow of data within the terminal unit.

b. TR#—Which is the transmission number, is a single numeric character which is used to maintain continuity between adjacent messages. This number, which is always the character immediately following the STX signal is compared against a number contained in a transmit counter in the data processor. If the transmit counter number and the transmit number as received are equal, a signal is generated to data processor indicating that the message being received is the next sequential message.

c. ETX —This signal is the end of text signal and in a similar manner is used to activate a control member or flag to indicate that the message has been completed.

d. BCC —Is block character check which is basically a modulus two parity counter to check the parity of complete message text from TR# through ETX but omitting any embedded character.

The text portion of the received message is transferred from the F register 70, receive buffer, through the G register 72, and R register 76 and into the input storage buffer 154 having many more characters of storage than the F register. When the input storage buffer is full and the BCC is tested as correct, the data processor will then perform the required operation such as printing, form movement and lamp illumination to name but a few.

Immediately after the first message is received, the first input storage buffer 154 is closed and a second input storage buffer 156 is opened to receive the next message from the CPU.

In the processing of the text portion of the message, the text characters are again filtered to determine whether or not it is an alpha character, a numeric character or an instruction character. Alpha and numeric characters are then prepared for printing and instruction characters are decoded and executed by the data processor.

Transmit State Machine

Within the terminal unit 32, the information which is to be transmitted from the terminal unit begins by being entered into the data flow by a depression of a key on the keyboard 48, either an alpha or numeric key, and ends by being modulated in the modem. The terminal unit 32 through the operator, cannot automatically go online with the CPU but first must request to go online. Upon receipt of a permission message, the terminal unit is then placed online.

In order to place a terminal unit online with the CPU, the operator depresses a supervisory control key which generates the following message:

| | | |
|---|---|---|
| ST | S | EB |
| TR | C | TC |
| X# | K | XC |
| | #1 | |

where:

a. STX which means start of transmission: This character is a constant character which is stored in memory and is withdrawn from memory and assembled with the message to be transmitted;

b. TR This is the transmission number which is the numeric output of a zero to nine counter. The first transmission number used in the preferred embodiment is nine and the second number is zero. The counter is incremented at the beginning of a new transmission. The transmission number is used to provide a sequential check of the order of all transmitted messages and merely indicates whether or not the message received by the CPU, in this example, is the next sequential message.

c. SCK1, in the present example of the preferred embodiment, is a special control key which indicates to the CPU, that the terminal unit is requesting to go online.

d. ETX is the end of transmission character and means that the message context has been completed. This character is inserted by the program to define end of text.

e. BCC is the horizontal parity check of each character in the message beginning with the TR# and ending with ETX. This parity check is a modulus two sum of each bit position.

Once the SCK1 key is depressed, the terminal unit 32 progresses from an off-line condition to an idle or ready condition completely dependent upon the CPU 30 before further operation is permitted. If the foregoing message is properly received by the CPU, the CPU will cause a one character message to be sent. This message is the character ACK which is defined as ACKNOWLEDGEMENT and indicates that the message received by the CPU was correct as far as parity.

If the CPU is ready to receive transmissions from the terminal unit, the CPU will send the same message as received from the terminal unit and if properly received, the terminal unit will transmit an ACK and progress from idle or ready to online.

With the depression of the first key on the keyboard 48, the message to be transmitted begins to be assembled into a temporary storage register. Depression of a key on the keyboard actuates the keyboard readout 158 as described in the application assigned to Perkins et al. and shown in FIG. 22. The readout develops an eight-bit code which comprises seven data bits according to the ASCII chart plus one even parity bit. The output of the keyboard readout is electrically connected in bit parallel to a four-position register called the A register 160.

Figure 22:
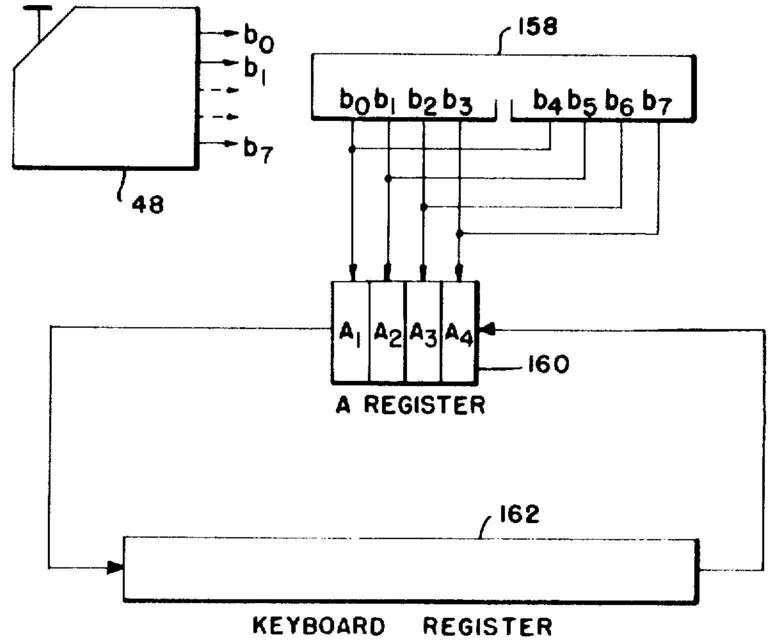
FIG. 22 is an illustration of the keyboard to keyboard register information flow.

The A register is electrically connected in bit serial with the keyboard register 162 as shown in FIG. 22. Since the code for the depressed key is an eight-bit code, the data is entered into the A register at two different times. The first four bits $b_0$ to $b_3$ of information are entered in the A register in parallel and serially shifted out into the keyboard register. After the fourth bit has been loaded into the keyboard register, the next four bits, $b_4$ to $b_7$ are loaded in parallel into the A register and serially shifted into the keyboard register.

Since the first data key has been depressed, the assembled message will take the following form:

| | | |
|---|---|---|
| ST | | EB |
| TR | TEXT | TC |
| X # | | XC |

Under control of the firmware, the above message must be assembled by withdrawing the first constant, STX, from memory and storing in the assembled word in the first character position CHO, then withdrawing the transmission number from its counter and storing it in the second character position, CH1. Since this is the second transmission, the transmission number is zero. the third character position, CH2, begins the actual contents of the text.

In the data processor, a special eight-character register called the R register 76 is used for temporarily assembling the several characters from the various registers and storage areas and then transferring the assembled characters to any one of the desired send storage registers or buffers 164 and 166. As has been described, this register 76 is the main transfer register within the information flow of the terminal unit. Therefore, in the first character position, CHO, of the R register the constant STX is stored in the second character position, CH1, the transmission number is stored and the first data bit is stored in the third position CH2.

Upon the command XCHRG the contents of the R register 76 will be exchanged with the contents of the G register 72 which is also an eight-character register. As previously illustrated in FIG. 6 the G register is in the data-comm controller section of the terminal unit and functions to transfer information between the data-comm controller and the rest of the terminal unit.

Information to be transmitted is stored in the lower four characters of the F register 70, CHO through CH3 or bit position BT0 through BT31. The control of each data bit is by a bit pointer which is stored in the H register 74.

Therefore, under the command XCHGFL the first four characters of the G register are exchanged with the first four characters of the F register.

Figure 23:
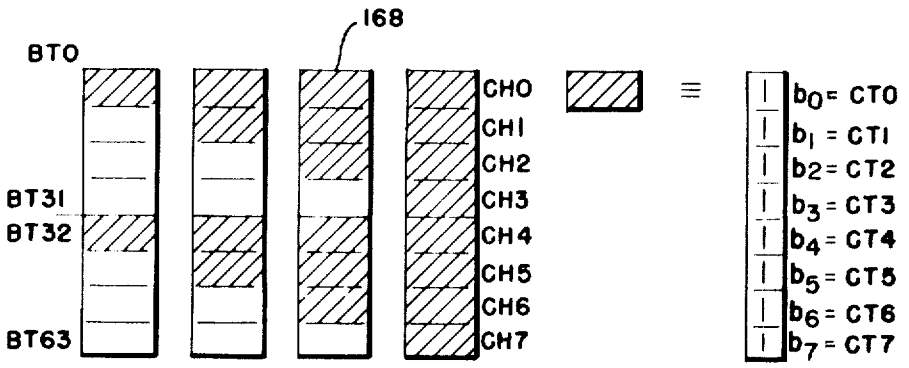
FIG. 23 is an illustration of four memory words in a terminal unit.

Also initiated from the depression of the first data key and under the execution control of data processor is the loading of the bit position in the H register. Illustrated in FIG. 23 are four 64-bit words, each word having eight characters CH0 through CH7 and each character having eight bits, $b_0$ through $b_7$. The crosshatched areas represent characters comprising all binary ones and the open areas represent characters comprising all binary zeros. From these four words the constants for the bit pointer are transferred via the R register 76 to the G register 72 to the H register 74.

In the example being described, the data-comm controller will transmit three characters so that the third word 168, having binary ones in bit position BT0 through BT23 will be used. Note that the third word 168 contains the following characters having all binary ones:

CH0, CH1, CH2, CH4, CH5, CH6.

For the present, only Ch0, CH1 and CH2 will be of interest. This word, all eight characters, is then copied in the R register and from there the instruction XCHRG places this word in the G register 72. As in exchange of the data from the G register, this word is now exchanged as a half word with the H register. The instruction XCHGHL causes the character CH0, CH1, CH2, CH3 to be placed in the corresponding character positions in the H register.

The bit pointer functions to point out or indicate the bit position which is to be transmitted. In the transmit state machine, each bit position of the H register 74 is read and if a binary one appears, the corresponding bit position in the F register 70 is transmitted. The bit pointer in the H register is then complimented to binary zero. Thus, as each bit position is transmitted, the number of bit pointers is decreased by one until all of the characters to be transmitted have been sent and the H register 74 has all zeros in CH0, CH1, CH2 and CH3.

At this time, the lower portion of the F register contains the first characters to be transmitted; namely, STX, TR# and the first data character and the first 24 bit positions of the H register contain binary ones for controlling the transmission of all the data in characters zero through two.

The next instruction withdrawn from the memory 56, which may be called XMIT, causes the upper four flip-flops of B register 78 to be set with a binary code for controlling and initiating the start of the transmission state machine. Information is transmitted from the F register, lower portion, via the pretransmit flip-flop PTFF 170, the transmit flip-flop TSFF 172 to the modem 38.

The transmit state machine comprises three flip-flop 174, 176 and 178 which in combination define the seven states of the transmit state machine which are as follows:

| | |
|---|---|
| TS0 | Initial state set TSFF to mark signal level. |
| TS1 | Reset TSFF to begin start bit. |
| TS2 | Control TSFF for eighth data bit which is the parity bit. |
| TS3 | Search H register for bit pointer and gate data from F register to PTFF. |
| TS4 | Timing state to synchronize the state machine with the bit counter to open the H and F register during TS3. |
| TS5 | Not used. |
| TS6 | Control TSFF for generation of stop bit. |
| TS7 | Gate PTFF to TSFF for generation of data bits. |

Figures 17, 18:
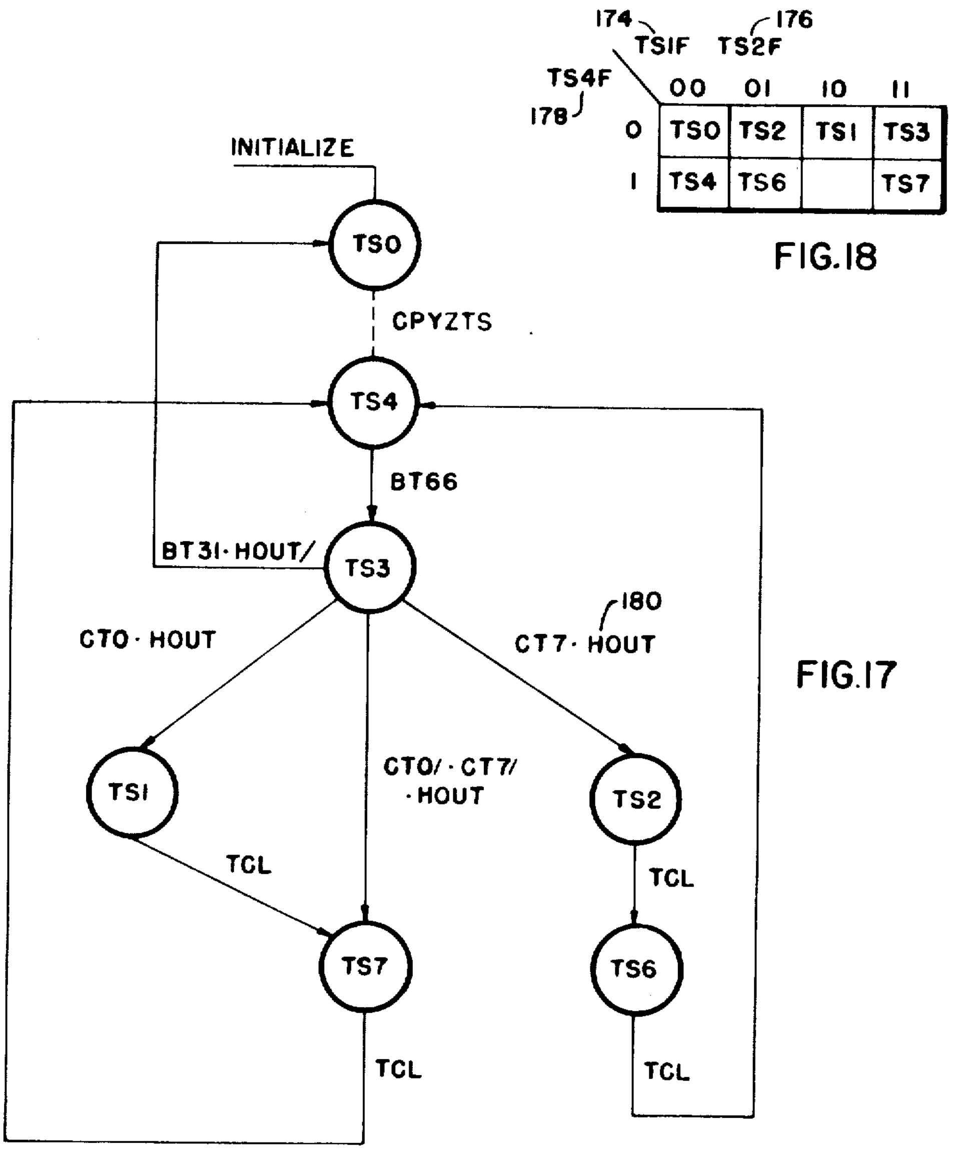
FIG. 17 is the Transmit State Machine diagram.
FIG. 18 is a Karnaugh Map of FIG. 17.

Referring to FIG. 17, the transmit state machine, and FIG. 19 the logic elements controlling PTFF 170 and TSFF 172 and FIG. 21 the timing diagram for the transmit state machine, the transmission of STX will be described. The ASCII code for STX is:

STX = 0100 000 plus parity

Therefore, the first character CH0 of the F register 70 has the same bit information including the parity bit. In the preferred embodiment, the parity is even and therefore the eight bit, BT7, is one.

The instruction XMIT causes the upper four flip-flops of B register 78 to contain the binary value of four to set the TS4F flip-flop 178. When the contents of the B register are gated to the transmit state machine flip-flops, the state machine progresses from TS0 to TS4. Since this operation is asynchronous with respect to the basic timing of the data processor, TS4 is used to synchronize the state machine with the proper bit control of H 74 and F 70 registers.

The bit timing signal, BT66, indicates the end of the bit timing clock and the next bit timing signal is BT0. The transmit portion of F AND H registers are from BT0 through BT31. Since this is the first character and is in the first character position, the H register 74 output, HOUT, will be true at BT0. In the state machine diagram, the timing notation CT0, CT1, CT2, CT3, CT4, CT5, CT6 and CT7 is used to indicate the bit times for each character; thus CT0 is character bit time zero and corresponds to bit time zero, eight, 16, etc., Bt0, BT8, BT16.

Figure 19:
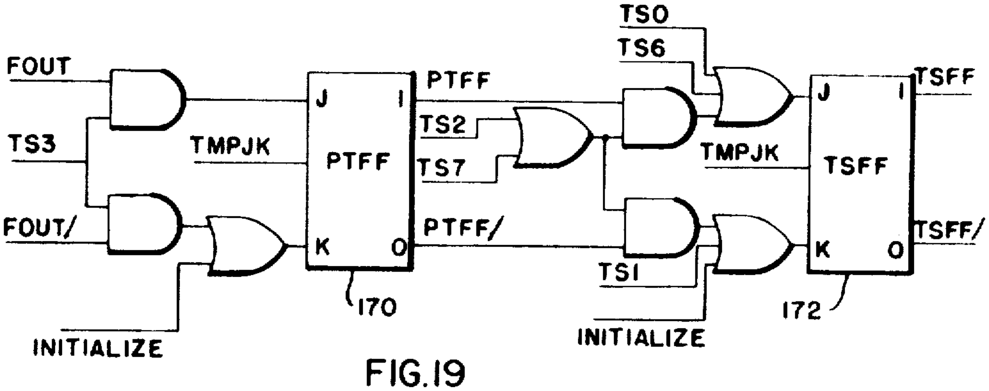
FIG. 19 is a logic diagram of the transmit state flip-flop.

In FIG. 19 TMPJK is a clock signal which appears at the middle of each BT time. TMPJK is 500 nanoseconds wide pulse and BT timing pulses are approximately four microseconds wide. Therefore, in state three, TS3, each bit position from the F register 70 is clocked into PTFF 170. When the state machine leaves TS3 under control of H register 74, the value of the data bit to be transmitted is stored in PTFF 170.

In the present example, the state machine must transmit both the start pulse and the first data pulse before again addressing the F register 70. TS3 is terminated by the presence of the bit pointer in the H register and since this is character time zero, CT0, the state machine progresses to TS1 where it will remain for a period of time equal to the transmission of one data bit. This time is measured by the transmit clock generator or TCL. When the state machine progresses to TS1, TSFF 172 is reset from a set condition representing a "mark" signal to the reset condition representing a "space" signal. This is shown in FIG. 21 where TSFF represents STX and the vertical lines indicate the data boundaries of each bit.

At the end of the first TCL period, the state machine progresses to TS7 where the output of PTFF 170 is gated to TSFF 172. PTFF contains the first data signal of the STX character which was read from the F register 70 in TS3. In this instance it is a zero and PTFF 170 is reset. TSFF 172 remains at a space condition for one more TCL period.

At the end of the second TCL period, the state machine progresses to TS4 where the state machine is again resynchronized with BT timing. At BT66, the state machine progresses to TS3 where both the F and H registers 70 and 74 are again searched. The first binary one in the H register now appears at CT1 time and the state machine progresses to TS7. In TS3 the output of PTFF 170 is gated to TSFF and supplied thereby to the modem 38.

The above mentioned procedure continues from CT1 through CT6 time to transmit the data information which is stored in the F register 70. When the state machine is in TS3 for the eighth bit, the next state is TS2 when the bit pointer is found and HOUT becomes true. At this time the character bit time is CT7. During TS2 the parity bit is set into TS1 and at the next TCL pulse the state machine progresses to TS6 where TSFF 172 is set true to transmit the stop pulse which is always a mark signal.

On the next TCL pulse the state machine returns to TS4 for resynchronizing with BT timing. Since the F register 70 in the present example contains another character to be transmitted, a bit pointer will be found in TS3. However, if this was the last character in the F register and the BT timing reached BT31 without finding a bit pointer, HOUT would be false and the state machine would return to TS0.

In order to transmit a series of characters which comprises a message it is therefore necessary that the firmware control assemble the message in the F register 70 while the transmit state machine 54 is functioning. Since the transmit state machine is not dependent upon firmware control after being initiated, the data processor can function independently of the transmit state machine and maintain the F and H registers 70 and 74 in a condition for transmission.

Figure 21:
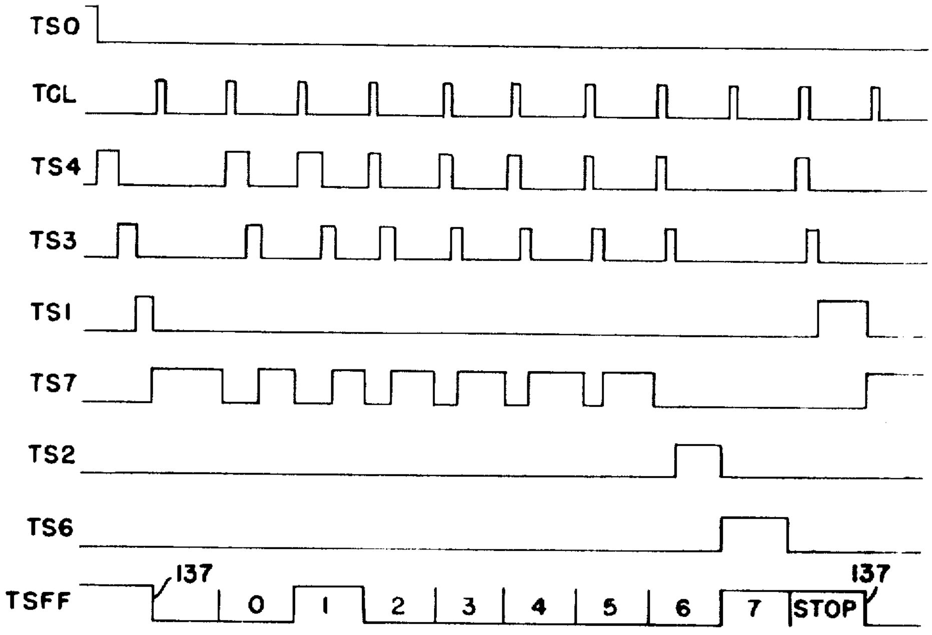
FIG. 21 is a timing chart for the Transmit State Machine.

In FIG. 21 the wave shape for TSFF shows the mark and space voltages for each data bit CT0 through CT7 for STX and shows the mark level for the stop bit. Also the start bit is indicated.

Program Control

Figure 25:
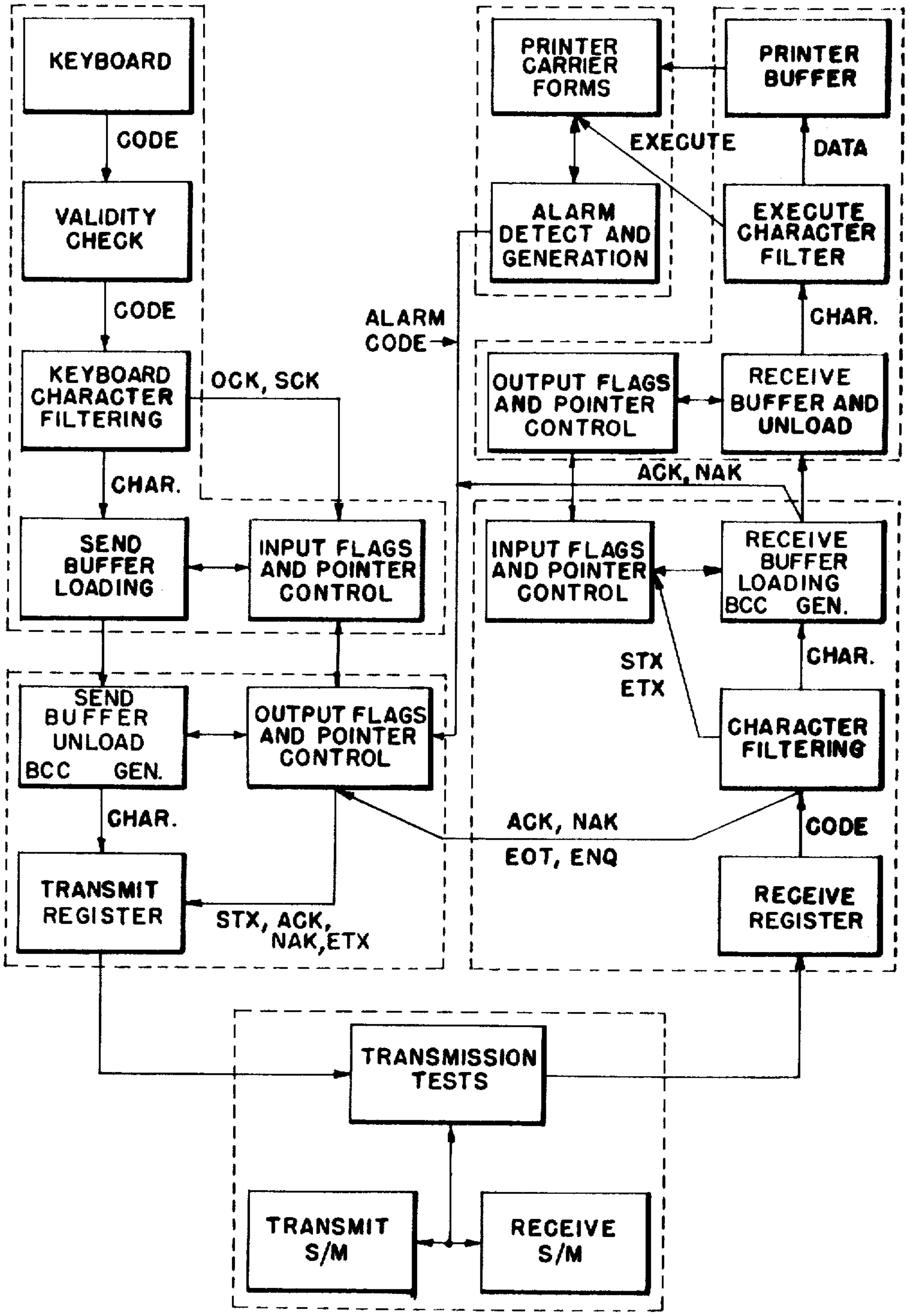
FIG. 25 is a block diagram of program control.
Figure 26:
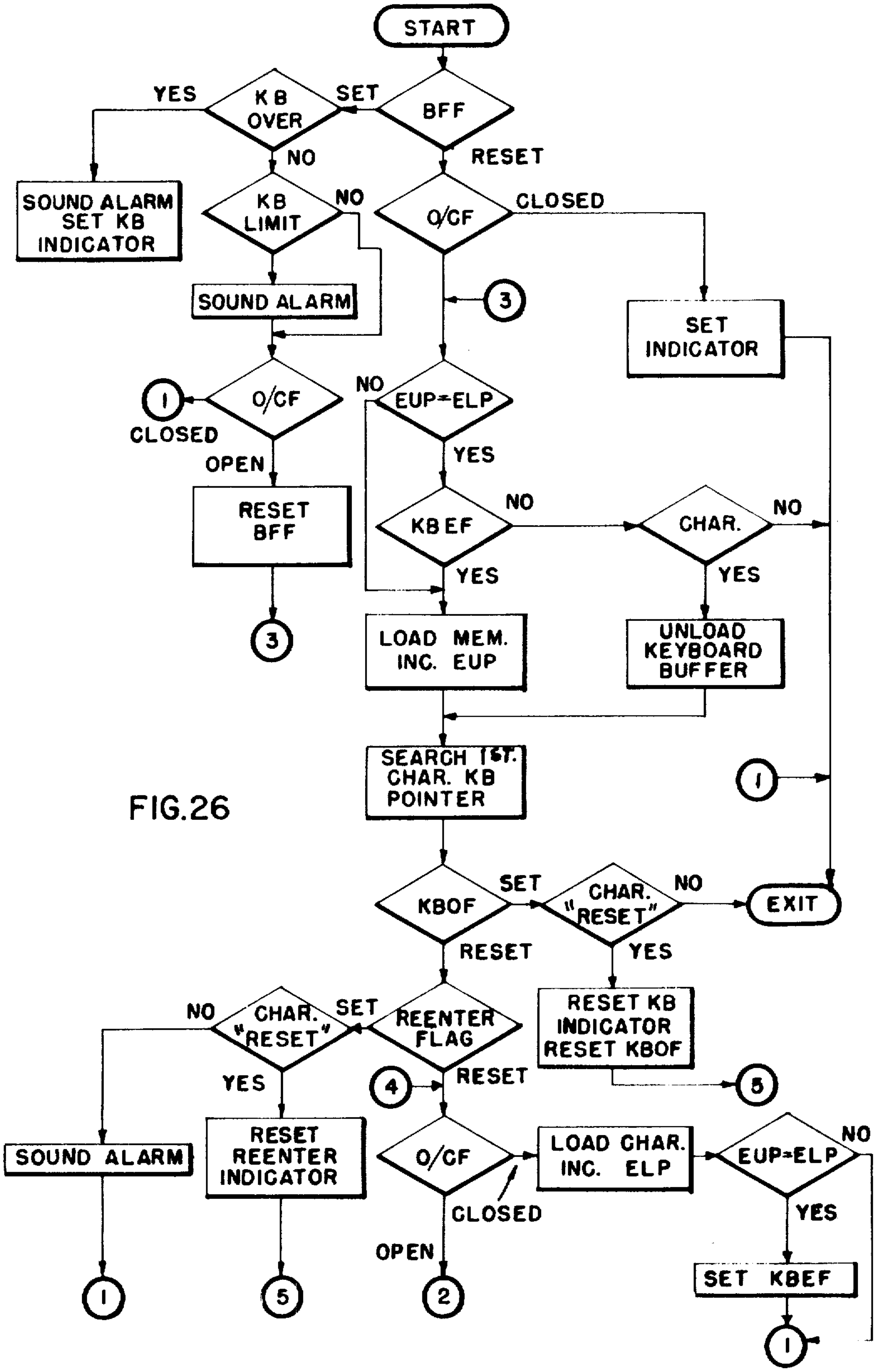
FIGS. 26 and 27 are the data flow diagrams of Send Buffer Input Control.
Figure 27:
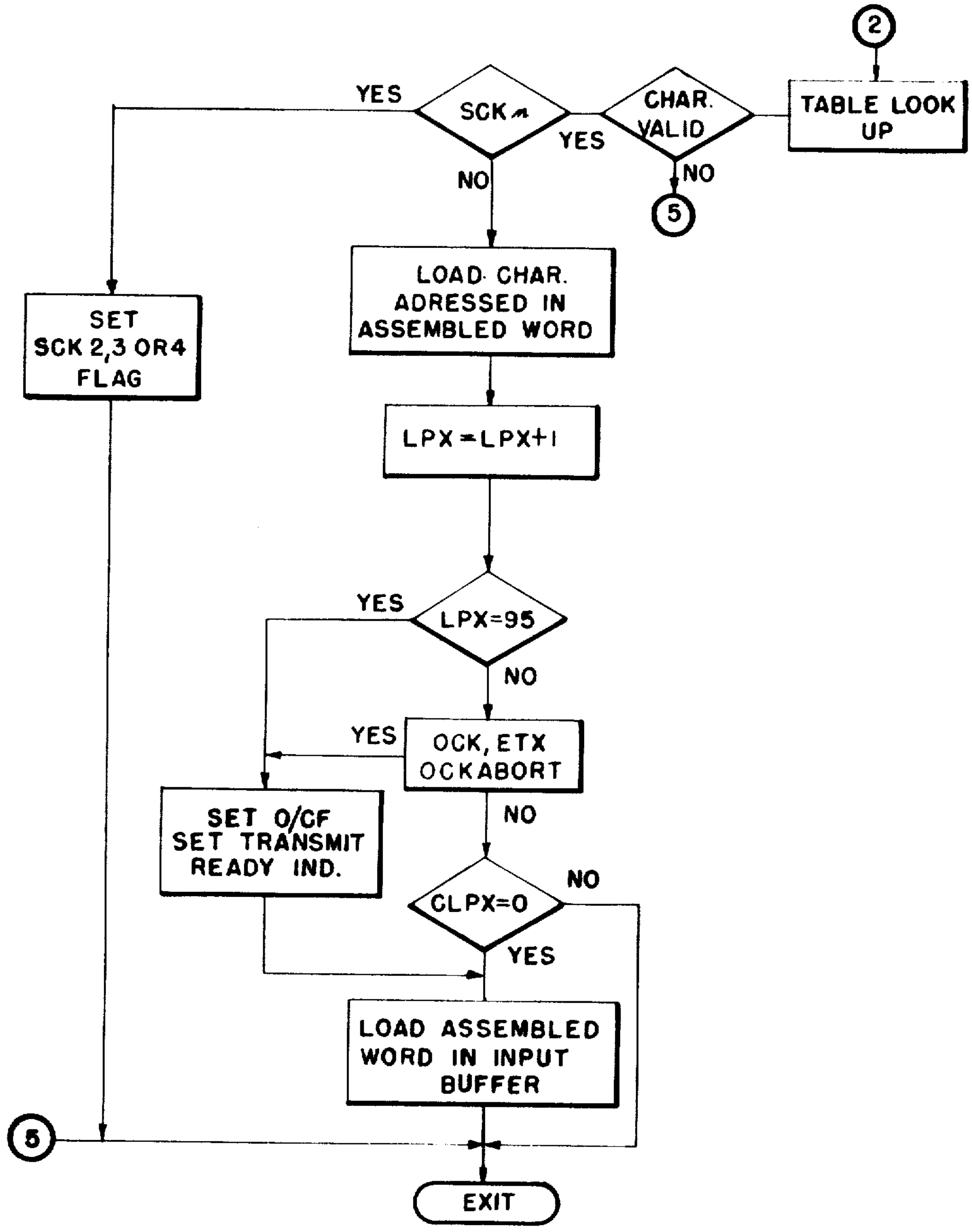
Figure 28:
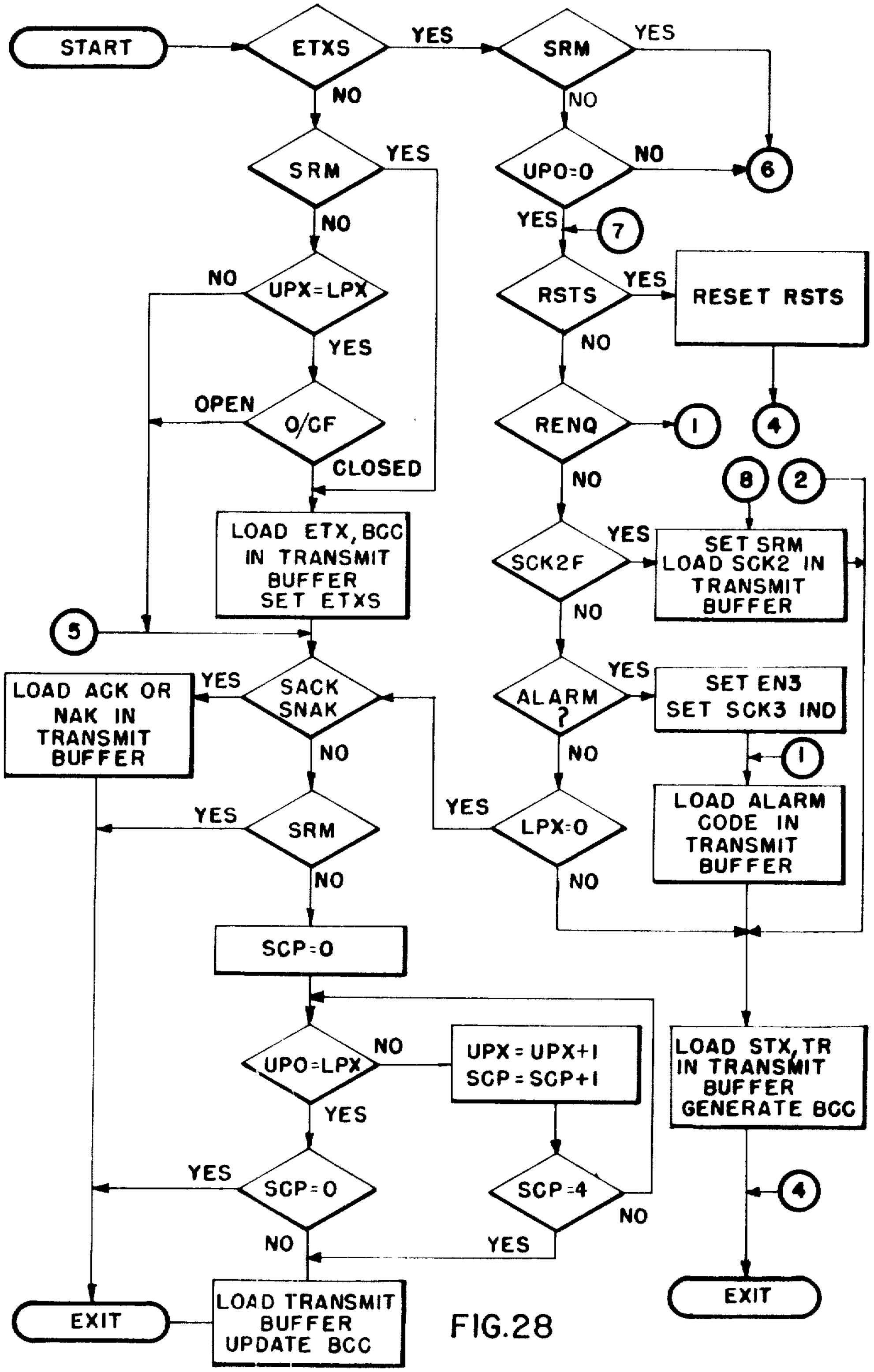
FIGS. 28 and 29 are the data flow diagrams of Send Buffer Output Control.
Figure 29:
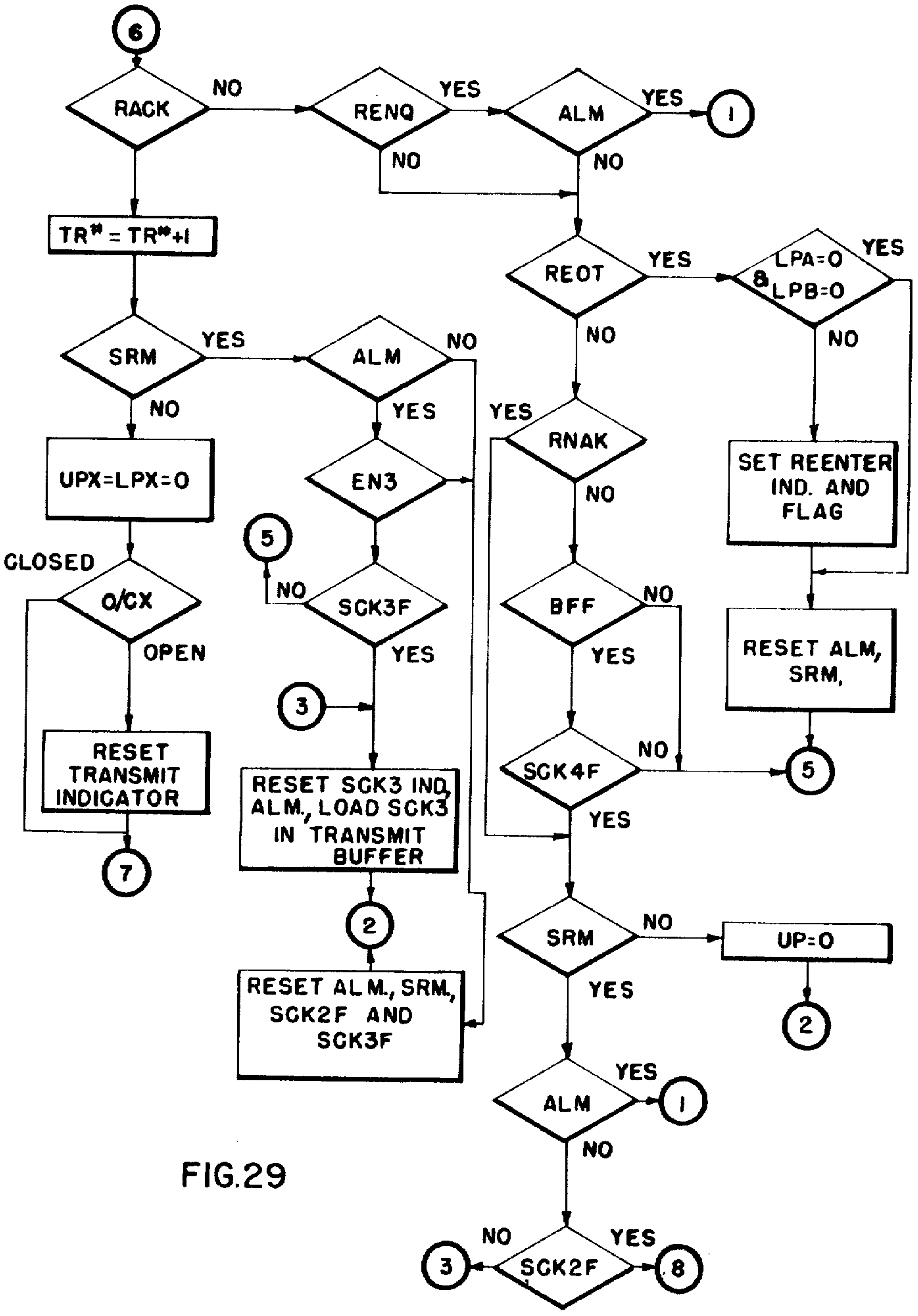

Referring to FIG. 25, there is shown in functional block diagrammatic form, the organization of the program control of the terminal unit 32. FIGS. 26 and 27 are the flow diagrams for the send buffer input control procedure. FIGS. 28 and 29 are the flow diagrams for the send buffers output control procedure. These four figures taken together illustrate the data flow of information from the keyboard 48 through the send buffers 164 or 166 to the transmit state machine 54 and then to the communication channels 34.

Figure 30:
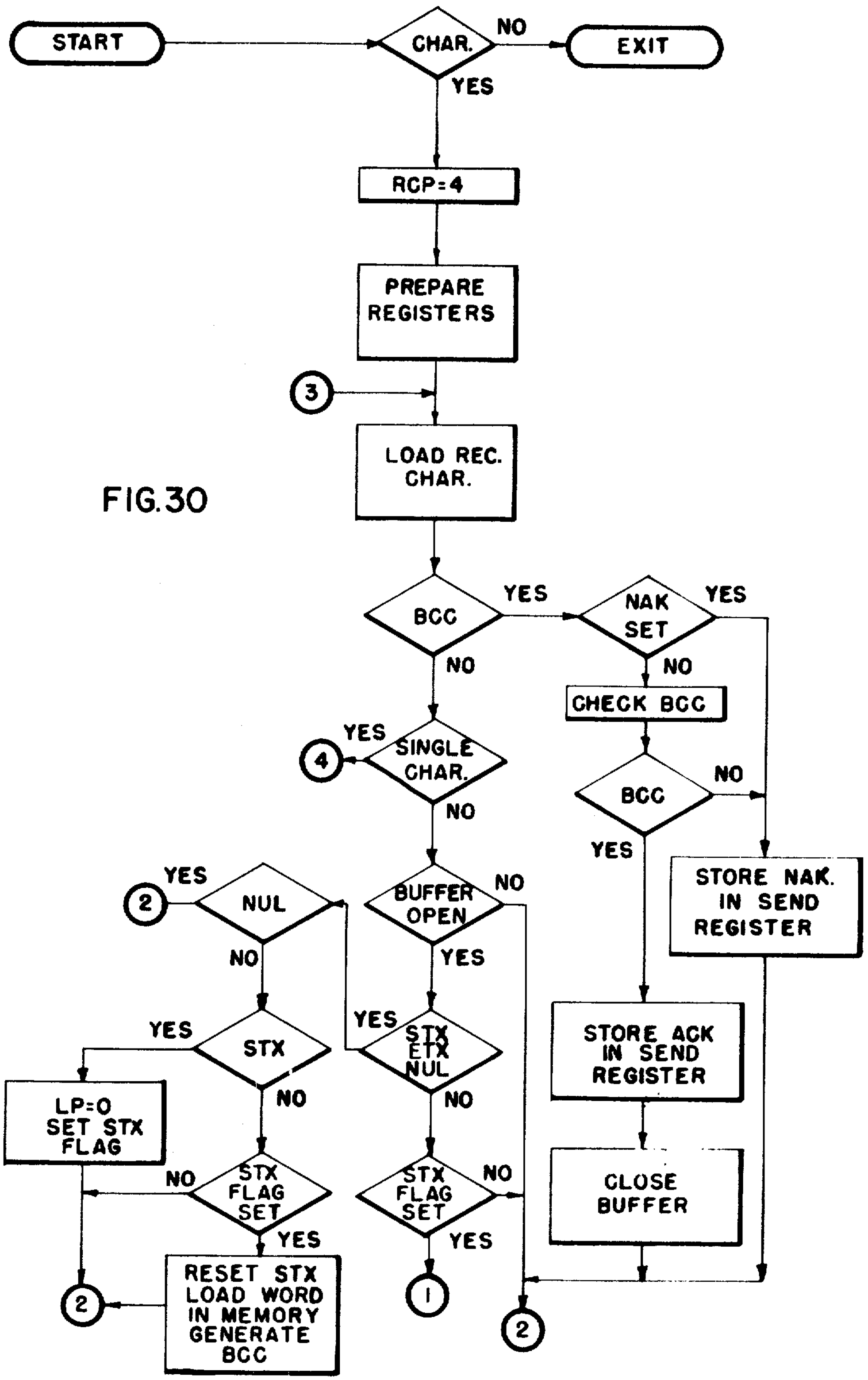
FIGS. 30 and 31 are the data flow diagrams of Receive Buffer Input Control.
Figure 31:
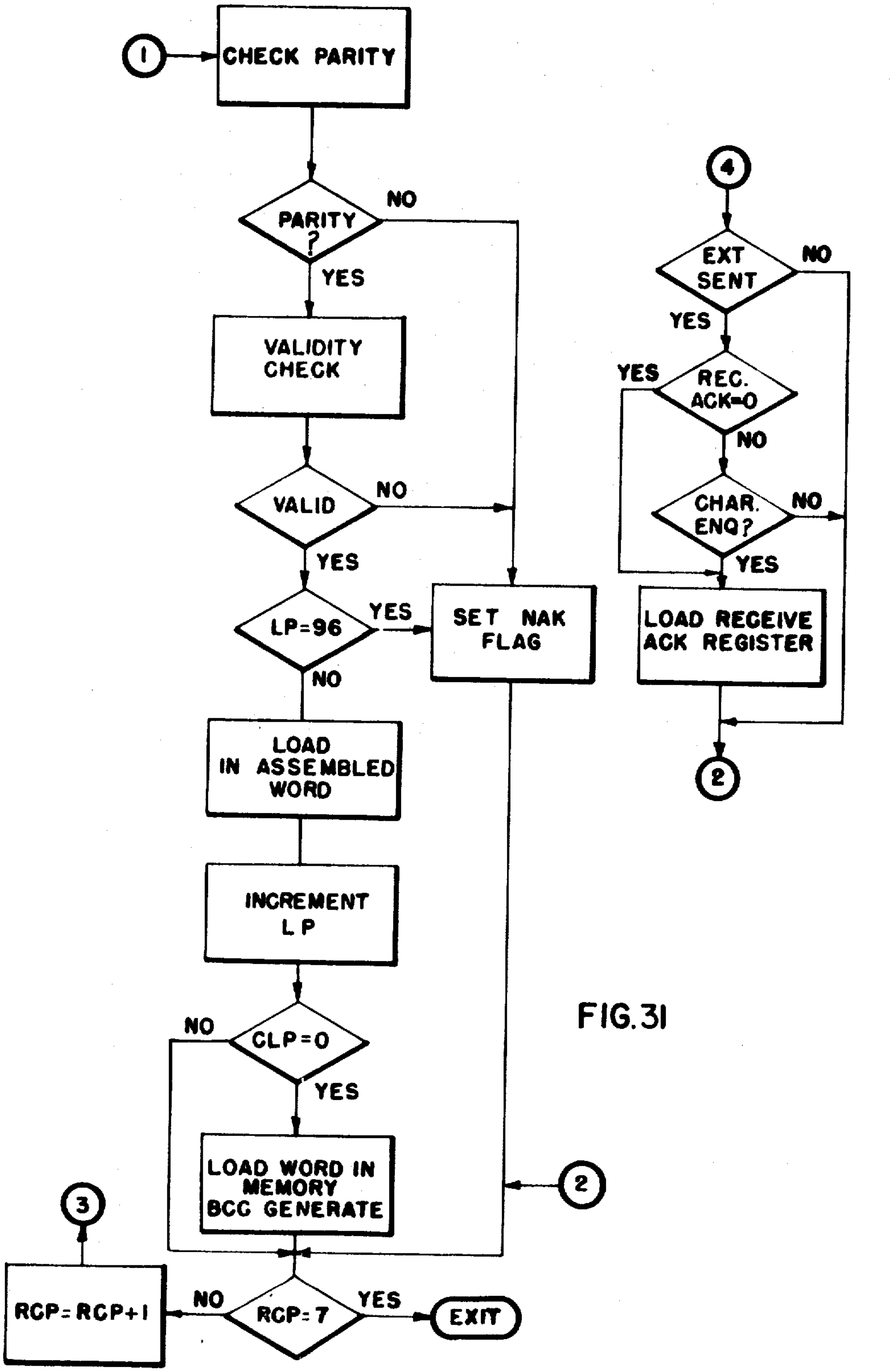
Figure 32:
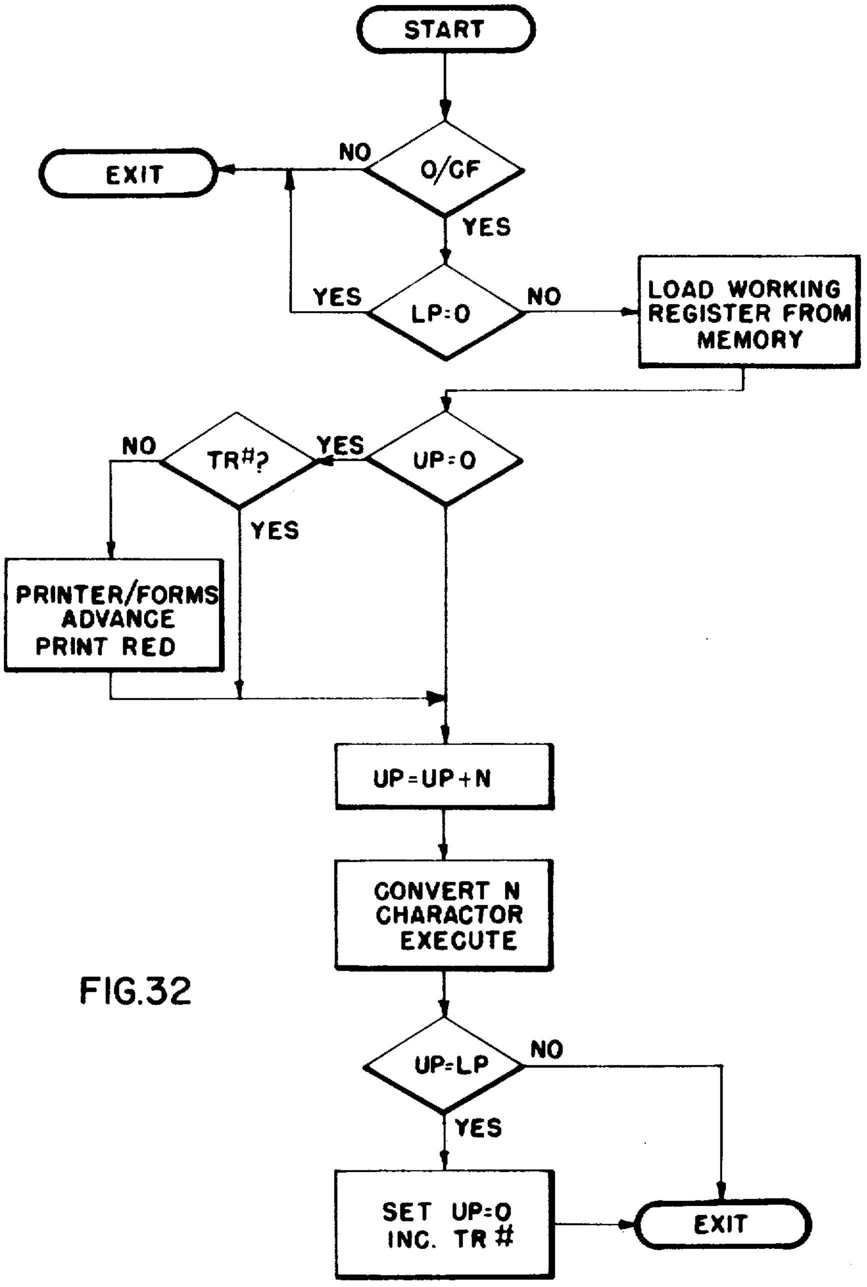
FIG. 32 is a data flow diagram of Receive Buffer Output Control.

In a similar manner, information received from the communication channel 34 is controlled by the program controls as shown in flow diagrams of FIGS. 30 and 31 which are the receive buffer input control procedure and FIG. 32 which is the receive buffer output control procedure. Thus, when data is received from the communication channels 34 by the receive state machine 52, the data flows through the receive buffers 154 and 156 into the memory 40 for the control of the printer 50 so as to visibly print the information which has been received from the CPU 30.

Send Buffer Input Control Procedure

This procedure unloads the keyboard register 162, detects operator control keys, OCK's, detects supervisory control keys, SCK's, loads the send buffer 164 or 166 and prepares the data for transmission. The output control procedure unloads the send buffers 164 or 166 and stores the characters in the temporary transmit register for transmission to the communication line 34. The loading of the characters from the temporary transmit register to the transmit register which is F register 70 lower, is a function of the send and receive procedures for the transmit state machine 54 as hereinbefore described.

There are two kinds of messages which are to be considered for transmission. The first is the normal messages which are entered from the keyboard and loaded into any one of the send buffers and second, service messages which may be any one of the following:

Alarm message

Off line request message (controlled by SCK2 from the keyboard)

Continue message (controlled by SCK3 from the keyboard)

Each of the send buffers 164 or 166 has a load pointer, LP, that counts the loaded characters and an unload character, UP, that counts the unloaded and subsequently transmitted characters. Thus, the following equation is always satisfied: UP is equal to or less than LP. The pointers are designated by the following notation: SLPX or SUPX wherein the X defines either one of the end buffers 164 or 166 A or B and U and L defines unload or load respectively. The symbol CLPX or CPUX refers to the character address part of the pointer which is the first three bits of the address.

In the preferred embodiment, the input buffers 154 and 156 and the send buffers 164 and 166 are so interlaced in memory that part of each word is the input buffer and part is the send buffer. Therefore, when CLPX becomes equal to four, the load or unload pointer must be then incremented by four to give the address of character zero of the next word. In addition to the load and unload pointers the input and the output of the send buffers are controlled by four flags. The characters entered from the keyboard are to be loaded in the buffer which is in the loading state. Only one buffer may be in the loading state at any given time and this is controlled by the send loading buffer flag, SLBF. When this flag is set the loading buffer is buffer B and when it is reset the loading buffer is buffer A. The fact that a buffer is in the loading state is not sufficient to allow characters to be loaded into the buffer and therefore the buffer is further provided with an open/close flag labeled SOCA and SOCB. When the corresponding flag is set the buffer is closed and no more characters can be loaded into that buffer.

Characters to be transmitted are unloaded from the buffer which is in the unloading state. The send unloading buffer flag SUBF indicates which buffer is in the unloading state in the same as was defined for the loading buffer flag. A buffer may be in the unloading and loading state at the same time; however, at initialization both buffers are open and buffer A is put in the loading and unloading state. As with the load pointers the notation OCX is understood for the open/close buffer A or B.

FIGS. 26 and 27 which are send buffer input control procedure, functions to unload the characters from the keyboard buffer 162 and to load them into the send buffer 164 or 166 after character filtering. Filtering will detect the SCK keys and the corresponding flags will be set and acted upon later by the output procedure. Filtering also looks for OCKETX and OCKABORT signals and the detection of either one of these codes will close the send buffer which is in loading state and bring the other send buffer into the loading position. However, if at this time both send buffers are closed then the send buffer full flag is set indicating the buffers are full and the keyboard should not be reentered. The send buffers are also automatically closed when their capacity of 95 characters is reached.

In assembling the message to be sent, the valid characters and the OCKETX and OCKABORT codes are first loaded in the assembled word and then this word is transferred from the assembly word into the send buffer each time four characters have been entered or the buffer is closed. The transmission number is not loaded in the buffer but is stored in a special transmission register STR .

When the REENTER indicator is set following receipt of EOT the procedure will not accept any code other than "reset" from the keyboard. When this code is detected the reset to send flag RSTS is set which informs the output procedure to send that code in response to received EOT.

Send Buffer Output Control

The send buffers output control procedure of FIGS. 28 and 29 unloads the characters to be transmitted from the send buffer and stores them in the temporary transmit register as well as loading the corresponding transmit pointers. As previously mentioned there are two types of messages to be sent, a normal message and a service message. If the service message is not under transmission which is recognized by the service message flag SRM, an ACK or NAK relative to the receive message is sent prior to the characters of the unloading send buffer. The transmission of a normal message, thus being delayed until the next execution of the procedure. The ACK or NAK to be sent are recognized by two flags. The send ACK flag, SACK, and the send NAK flag SNAK, which are set by the receive output control procedure.

When a send buffer is closed and all the characters have been transmitted the ETX and BCC codes are loaded in temporary transmit register and then in the transmit buffer 70. After ETX is transmitted the ETXS, which is the send flag, is set and indicates that the message is waiting for acknowledgement from the CPU. As soon as the received ACK is detected, the unloading buffer is released and the UPX and LPX are reset to zero. The send buffer is then opened allowing characters of the new message to be loaded by the input procedure. The unloading state is then transferred to the other buffer TR# is incremented for the next message.

If NAK is received for the message then only the UPX is cancelled and the buffer remains in the unloading state so the same message is transmitted with the same TR#.

If EOT is received both buffers are reinitialized and the reenter indicator is set together with the corresponding flag REEF. All service messages waiting to be sent are cancelled. The reenter indicator is not on, however, if both send buffers are empty. A received ENQ is ignored as an acknowledgement character if the waiting message is not an alarm message. Otherwise, ENQ is acted upon when ACK has been received for the transmitted message.

When transmission of a message is completed, the procedure first looks for Reset to send, the received ENQ, SCK2 and alarm condition and acts correspondingly. If none of these conditions exist STX and TR# will be loaded into the transmit buffer and the characters of the next message will start to be transmitted on the next execution of the procedure.

Receive Buffer Input Control

In a similar manner the characters received from the communication channel are also checked and filtered. Each character as received is temporarily stored in the receive register which is the F register upper. As each character is withdrawn from this buffer, it is filtered to remove all single word messages which are ACK, NAK, EOT, and ENQ. These single word messages are transferred over to the send buffer output control procedure and acted on accordingly. Also in the filtering the two heading characters of a message, STX and ETX, are withdrawn and supplied to the input flags for control of the incoming message. All other valid characters are transferred to the receive buffer and BCC is generated according to the received characters. This procedure is shown in FIGS. 30 and 31 which are the received buffers input control procedure.

When the BCC character is received, checked and filtered it is compared with the generated BCC and if found correct the receive buffer is closed and ACK is generated and sent to the send register. However, if they do not agree, that is if the BCC as generated is different than the BCC as received than an NAK is generated and sent into the send register for transmission to the CPU.

Receive Buffer Output Control

Referring to FIG. 32 which is the receive buffer output control procedure, the output flags are first checked to see whether or not the unloading buffer is closed. If the load pointer is equal to zero this indicates the buffer is empty and the procedure ends. If the load pointer is not equal to zero, the working registers are loaded from the message as received. The next test to be performed is that of checking the unload pointer. If the unload pointer equals zero, UP = 0, then the expected transmission number is checked with that stored in the terminal unit. If they agree then the procedure continues to unload the characters from the input buffer. All instructional characters are then executed and directed by the logic to the printer, forms advance, or carrier. All data characters are directed to the printer buffer and prepared for visible print.

When the unload pointer equals the load pointer, UP = LP, the unload pointer is set to zero, the expected transmission number is incremented by one, and the procedure begins waiting the next message.

What is claimed is:

1. A real time, online data processing terminal unit operable via a communication channel coupling said terminal unit with a central data processing computer, said terminal unit comprising:

keyboard means for manually entering both data and program information into the terminal unit;

program loading means for automatically entering program information into the terminal unit;

memory means adapted to receive and store data and program information from said keyboard means and to receive and store program information from said program loading means;

printing means responsive to the data stored in said memory means and controllable by the program information stored in said memory means for selectively printing the data information according to the program information;

logic means operatively coupling said printing means, said keyboard means and said program loading means with said memory means for controlling the flow of data and program information signals thereamong at a first frequency;

means operatively controlled by said logic means for receiving data information from the central data processing computer via the communication channel at a second frequency;

means operatively controlled by said logic means for transmitting data information to the central data processing computer via the communication channel at a second frequency;

control means including a single bit pointer register for indicating transmit bit times and receive bit times for simultaneously transmitting data information to and receiving data information from the communication channel; and synchronizing means operatively connected to said receiving means and said transmitting means for synchronizing the communication rate of the communication channel with the processing rate of the terminal unit for effecting the transfer of data information by said receiving means and said transmitting means.

2. The real time, online data processing terminal according to claim 1 wherein the means for transmitting data information includes:

a recirculating multiple-stage shift register for temporarily storing in binary encoded form and in bit-numerical sequence the data information to be transmitted; and transmit state control means to control the bit by bit flow of data information from said recirculating multiple-stage shift register as indicated by said bit pointer register to the communication channel.

a recirculating multiple-stage shift register for temporarily storing each binary bit of data information in bit-numerical sequence as received from the communication channel; and receive state control means controlling the flow of each bit of data information from the communication channel to the recirculating multiple-stage shift register and position the received data bit in said stage according to the indication of said bit pointer register.

4. A full duplex real time, online data processing terminal unit operatively coupled via a communication channel to a central processor unit, said terminal unit comprising:

a keyboard having an alpha section and a numeric section, said keyboard for entering data information and message format information;

a plurality of supervisory control keys for generating single character messages;

program information receiving means;

memory means having a plurality of addressable sections for storing data information from said keyboard, single character message from said control keys and program information from said program information receiving means;

printing means operatively coupled to said alpha keyboard and said numeric keyboard for visibly displaying the information entered on said alpha keyboard and on said numeric keyboard and operable to display information stored in said memory means;

first register means operatively coupled to said memory means for receiving data information from or transferring data information to an individual one of said addressable sections of said memory means at a first data rate;

second register means operatively coupled to said memory means for temporarily storing program information from said memory means;

first control means operatively coupled to said second register means and responsive to said program information temporarily stored therein for controlling the transferring of data information from said memory means to said printing means;

third register means operatively coupled to said first register means and responsive to said program information temporarily stored in said second register means for transferring data information between said first and third register means;

receiver means electrically connected to the communication channel for serially receiving data information;

fourth register means having a first and second portion, said second portion operatively coupled to said receiver means for receiving data information in bit serial form from said receiver means and temporarily storing said data information;

fifth register means having a first and second portion, said second portion, operatively coupled to said second portion of said fourth register means and responsive to said receiver means for indicating which bit position in said second portion of said fourth register means contains data information and which bit position is available to receive data information from said receiver means, said fifth register means having a plurality of predetermined bit positions indicating information transfer conditions;

second control means responsive to program information temporarily stored in said second register means for transferring data information between one of said portions of said fourth register means and said third register means at one of a plurality of said predetermined bit positions of said fifth register means;

transmitter means operatively coupled to said fourth register means to serially transmit data information from said first portion of said fourth register means to said communication channel at a second frequency bandwidth according to the bit position indicated by said first portion of said fifth register means; and a timing synchronizer for synchronizing the flow of data information within said terminal unit between said first and second date rates of said communication channel and said memory means.

5. A full duplex real time, online data processing terminal unit according to claim 4 wherein each of said register means is a dynamic recirculating shift register adapted to store at least 64 binary encoded bits of data or program information.

6. A full duplex real time, online data processing terminal unit according to claim 5 wherein said first portion of said fourth and fifth register means each having a like number of bit positions and said second portion of said fourth and fifth register means each having a like number of bit positions, said first portion of each register operatively coupled together to control the serial bit flow of information to said transmitter means and said second portion of each register operatively coupled together to control the serial bit flow of information from said receiver means.

7. A full duplex real time online data processing terminal unit according to claim 6 wherein said fifth register means has a binary one in each bit position of said first portion for each data bit in the first portion of said fourth register means and said fifth register means has a binary zero in each bit p position of said second portion for each data bit received in said second portion of said fourth register means.

8. A full duplex real time online data processing terminal unit according to claim 6 wherein said first and second portions of said fourth and fifth register means are equal and contain 32 bit positions.

* * * * *

UNITED STATES PATENT OFFICE

CERTIFICATE OF CORRECTION

Patent No. 3,626,382 Dated December 7, 1971

Inventor(s) John H. Pedersen et al.

It is certified that error appears in the above-identified patent and that said Letters Patent are hereby corrected as shown below:

Column 3, line 21, "unit 43 comprises" should read -- unit 32 comprises --. Column 5, line 60, "of only data processor" should read -- of the data processor --. Column 7, line 20, should read -- XTALFF/ = XTAL/ · TMPJK --. Column 9, line 33, "F register when the terminal" should read -- F register. Information can be removed from the F register when the terminal --. Column 12, line 43, "TR This is" should read -- TR#. This is --. Column 19, lines 17 and 18, after "channel." and before "a recirculating" insert -- 3. The real time, on-line data processing terminal according to claim 1 wherein the means for receiving data information comprises: --. Column 20, line 53, "bit p position" should read -- bit position --.

Signed and sealed this 6th day of June 1972.

(SEAL)
Attest:

EDWARD M.FLETCHER,JR.
Attesting Officer

ROBERT GOTTSCHALK
Commissioner of Patents